(12) United States Patent
Chen et al.

(10) Patent No.: US 6,964,726 B2
(45) Date of Patent: Nov. 15, 2005

(54) ABSORBENT WEBS INCLUDING HIGHLY TEXTURED SURFACE

(75) Inventors: Fung-Jou Chen, Appleton, WI (US);
Jeffrey D. Lindsay, Appleton, WI (US);
Thomas F. Hunt, Appleton, WI (US);
John J. Urlaub, Oshkosh, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 149 days.

(21) Appl. No.: 10/329,991

(22) Filed: Dec. 26, 2002

(65) Prior Publication Data

US 2004/0123963 A1 Jul. 1, 2004

(51) Int. Cl.⁷ .......................... D21H 27/02; D21H 27/32; D04H 11/00; B41M 1/04
(52) U.S. Cl. ........................ 162/134; 162/135; 162/158; 162/123; 428/340
(58) Field of Search ................................ 162/134, 158, 162/135, 109, 111–113, 169, 123; 428/340–342, 152–154, 195.1

(56) References Cited

U.S. PATENT DOCUMENTS

| | | | |
|---|---|---|---|
| 2,222,539 A | * | 11/1940 | Meston ........................ 156/246 |
| 2,704,725 A | * | 3/1955 | Berglund ..................... 427/206 |
| 3,260,778 A | | 7/1966 | Walton |
| 3,696,183 A | | 10/1972 | Steel et al. |
| 3,708,565 A | | 1/1973 | Seiffert |
| 3,810,280 A | | 5/1974 | Walton et al. |
| 3,870,778 A | | 3/1975 | Steel |
| 3,879,257 A | | 4/1975 | Gentile et al. |
| 3,903,342 A | * | 9/1975 | Roberts, Jr. ................. 428/153 |
| 3,906,128 A | | 9/1975 | Burling et al. |
| 5,015,556 A | | 5/1991 | Martens |
| 5,019,211 A | | 5/1991 | Sauer |

(Continued)

FOREIGN PATENT DOCUMENTS

| | | | | |
|---|---|---|---|---|
| EP | 334574 A2 | * | 9/1989 | ........... A47L/13/16 |
| EP | 1262243 A1 | | 12/2002 | |
| EP | 1262531 A1 | | 12/2002 | |
| GB | 1088283 A | * | 10/1967 | ........... B29C/17/04 |

(Continued)

OTHER PUBLICATIONS

Abstract of Japanese Publication 2000313082, Nov. 14, 2000.

Abstract of Article entitled "Vivelle" by C. Knight, UMIST Nonwoven Conference, Paper No. 16, Jun. 1983, pp. 353–362.

PCT Search Report for PCT/US03/27316, May 4, 2004.

U.S. Appl. No. 10/305,791, filed Nov. 27, 2002, Fung–Jou Chen, et al., Structural Printing Of Absorbent Webs.

U.S. Appl. No. 10/305,792, filed Nov. 27, 2002, Fung–Jou Chen, et al., Soft, Strong Clothlike Webs.

*Primary Examiner*—José A. Fortuna
(74) *Attorney, Agent, or Firm*—Dority & Manning, P.A.

(57) ABSTRACT

The present invention discloses a paper web with a highly textured surface and a method of forming the highly textured web. The process includes printing a viscous material onto the surface of a paper web in a pattern with a low pressure printing process. Specifically, it has been discovered that certain low pressure printing technologies may be used to deliver a viscous material to the surface of a paper web such as a tissue, an air laid web, or a fibrous nonwoven web with good control of material delivery. At some point after the viscous material is applied to the web, the material may be fibrillated into a three-dimensional structure and then cured. In various embodiments, the viscous material may be fibrillated and cured so as to provide a good scrubbing surface to the web, provide an attachment structure on the web, or provide a good contact surface against a second substrate in forming laminate products.

25 Claims, 8 Drawing Sheets

U.S. PATENT DOCUMENTS

| | | | |
|---|---|---|---|
| 5,048,589 A | 9/1991 | Cook et al. | |
| 5,098,522 A | 3/1992 | Smurkoski et al. | |
| 5,120,360 A | 6/1992 | Tajiri et al. | |
| 5,175,072 A | 12/1992 | Martens | |
| 5,187,044 A | 2/1993 | Prioleau et al. | |
| 5,215,859 A | 6/1993 | Martens | |
| 5,279,697 A | 1/1994 | Peterson et al. | |
| 5,322,761 A | 6/1994 | Kausch et al. | |
| 5,334,289 A | 8/1994 | Trokhan et al. | |
| 5,399,412 A | 3/1995 | Sudall et al. | |
| 5,429,686 A | 7/1995 | Chiu et al. | |
| 5,462,835 A | 10/1995 | Mirle et al. | |
| 5,558,020 A | 9/1996 | Marozzi et al. | |
| 5,562,645 A | 10/1996 | Tanzer et al. | |
| 5,565,255 A | 10/1996 | Young et al. | |
| 5,607,760 A | 3/1997 | Roe | |
| 5,609,587 A | 3/1997 | Roe | |
| 5,656,132 A | 8/1997 | Farrington, Jr. et al. | |
| 5,670,110 A | 9/1997 | Dirk et al. | |
| 5,743,999 A | 4/1998 | Kamps et al. | |
| 5,772,845 A | 6/1998 | Farrington, Jr. et al. | |
| 5,798,202 A | 8/1998 | Cushner et al. | |
| 5,858,554 A | 1/1999 | Neal et al. | |
| 5,885,697 A | 3/1999 | Krzysik et al. | |
| 5,904,811 A | 5/1999 | Ampulski et al. | |
| 3,948,665 A | 4/1976 | Richter et al. | |
| 3,953,638 A | 4/1976 | Kemp | |
| 3,976,820 A | 8/1976 | Giovanelli et al. | |
| 3,983,278 A * | 9/1976 | Wardle | 428/92 |
| 4,076,874 A | 2/1978 | Giovanelli et al. | |
| 4,143,890 A | 3/1979 | Davis et al. | |
| 4,181,762 A | 1/1980 | Benedyk | |
| 4,183,889 A | 1/1980 | Brendel | |
| 4,189,336 A * | 2/1980 | Hutflesz | 156/72 |
| 4,225,384 A | 9/1980 | Valkama | |
| 4,264,705 A | 4/1981 | Allen | |
| 4,309,179 A | 1/1982 | Heuser et al. | |
| 4,326,000 A * | 4/1982 | Roberts, Jr. | 428/153 |
| 4,377,544 A | 3/1983 | Rasmussen | |
| 4,436,687 A | 3/1984 | Bye et al. | |
| 4,451,419 A | 5/1984 | Bye et al. | |
| 4,495,133 A * | 1/1985 | Sugihara et al. | 264/504 |
| 4,514,345 A | 4/1985 | Johnson et al. | |
| 4,517,278 A | 5/1985 | Sakurai | |
| 4,528,239 A | 7/1985 | Trokhan | |
| 4,578,504 A | 3/1986 | Hammar | |
| 4,637,859 A | 1/1987 | Trokhan | |
| 4,786,657 A | 11/1988 | Hammar et al. | |
| 4,919,877 A | 4/1990 | Parsons et al. | |
| 4,921,643 A | 5/1990 | Walton et al. | |
| 5,916,732 A | 6/1999 | Sasashita et al. | |
| 5,976,763 A | 11/1999 | Roberts et al. | |
| 5,990,377 A | 11/1999 | Chen et al. | |
| 6,017,417 A | 1/2000 | Wendt et al. | |
| 6,043,317 A | 3/2000 | Mumick et al. | |
| 6,096,412 A | 8/2000 | McFarland et al. | |
| 6,103,061 A | 8/2000 | Anderson et al. | |
| 6,103,062 A | 8/2000 | Ampulski et al. | |
| 6,126,784 A | 10/2000 | Ficke et al. | |
| 6,129,815 A | 10/2000 | Larson et al. | |
| 6,150,002 A * | 11/2000 | Varona | 428/99 |
| 6,187,137 B1 | 2/2001 | Druecke et al. | |
| 6,197,459 B1 | 3/2001 | Leach | |
| 6,197,479 B1 | 3/2001 | Tanaka et al. | |
| 6,214,274 B1 | 4/2001 | Melius et al. | |
| 6,231,719 B1 | 5/2001 | Garvey et al. | |
| 6,248,212 B1 | 6/2001 | Anderson et al. | |
| 6,287,581 B1 | 9/2001 | Krzysik et al. | |
| 6,322,665 B1 | 11/2001 | Sun et al. | |
| 6,395,957 B1 | 5/2002 | Chen et al. | |
| 6,410,097 B2 | 6/2002 | Kume et al. | |
| 6,423,180 B1 | 7/2002 | Behnke et al. | |
| 6,429,261 B1 | 8/2002 | Lang et al. | |
| 6,436,234 B1 | 8/2002 | Chen et al. | |
| 6,447,643 B2 | 9/2002 | Fingal et al. | |
| 6,500,289 B2 * | 12/2002 | Merker et al. | 156/183 |
| 6,761,800 B2 * | 7/2004 | Capizzi | 162/184 |
| 2002/0134520 A1 * | 9/2002 | Behnke et al. | 162/100 |
| 2002/0180092 A1 | 12/2002 | Abba et al. | |
| 2003/0118847 A1 * | 6/2003 | Chuang et al. | 428/447 |
| 2003/0118848 A1 * | 6/2003 | Liu | 428/447 |
| 2004/0079502 A1 * | 4/2004 | Capizzi | 162/135 |
| 2004/0084162 A1 * | 5/2004 | Shannon et al. | 162/109 |
| 2004/0084165 A1 * | 5/2004 | Shannon et al. | 162/158 |
| 2004/0099388 A1 * | 5/2004 | Chen et al. | 162/134 |
| 2004/0099389 A1 * | 5/2004 | Chen et al. | 162/134 |
| 2004/0118531 A1 * | 6/2004 | Shannon et al. | 162/109 |
| 2004/0118532 A1 * | 6/2004 | Sarbo et al. | 162/109 |
| 2004/0118544 A1 * | 6/2004 | Tirimacco et al. | 162/204 |
| 2004/0123963 A1 * | 7/2004 | Chen et al. | 162/134 |
| 2004/0131842 A1 * | 7/2004 | Urlaub et al. | 428/327 |
| 2004/0163784 A1 * | 8/2004 | Urlaub et al. | 162/135 |
| 2004/0163785 A1 * | 8/2004 | Shannon et al. | 162/158 |

FOREIGN PATENT DOCUMENTS

| | | | |
|---|---|---|---|
| GB | 1378638 | 12/1974 | |
| WO | WO 9711226 A1 | 3/1997 | |
| WO | WO 9718784 A1 | 5/1997 | |
| WO | WO 9920822 A1 | 4/1999 | |
| WO | WO 0020682 A1 | 4/2000 | |
| WO | WO 0030582 A1 | 6/2000 | |
| WO | WO 0048544 A1 | 8/2000 | |
| WO | WO 0071334 A1 | 11/2000 | |
| WO | WO 0119306 A1 | 3/2001 | |
| WO | WO 0120079 A1 | 3/2001 | |
| WO | WO 0131123 A1 | 5/2001 | |
| WO | WO 0147700 A1 | 7/2001 | |
| WO | WO 200149933 A2 * | 7/2001 | A41D/31/00 |
| WO | WO 200149937 A1 * | 7/2001 | B05D/1/28 |
| WO | WO 02081819 A1 | 10/2002 | |
| WO | WO 02098571 A2 | 12/2002 | |
| WO | WO 02098999 A2 | 12/2002 | |
| WO | WO 03057965 A1 | 7/2003 | |

* cited by examiner

ABSORBENT WEBS INCLUDING HIGHLY TEXTURED SURFACE

BACKGROUND OF THE INVENTION

Products made from paper webs such as bath tissues, facial tissues, paper towels, industrial wipers, food service wipers, napkins, medical pads and other similar products are designed to include several important properties. For example, for most applications, the product should be highly absorbent. In addition, products often should include surface texture in order to provide, for example, a good wiping surface in the case of wiping products or a soft surface texture in products which may be used while in contact with skin. Moreover, absorbent paper products which are multi-ply laminated products should avoid delamination under conditions of use.

Methods for increasing texture at the surface of a paper product are well known in the art. One well-known method is embossing, wherein the fibers in the web are mechanically deformed under high mechanical pressure to impart kinks and microcompressions in the fibers that remain substantially permanent while the web is dry. When wetted, however, the fibers may swell and straighten as the local stresses associated with the kinks or microcompressions in the fiber relax. Thus, embossed tissue when wetted tends to lose much of the added surface texture imparted by embossing, and tends to collapse back to a relatively flat state. Similar considerations apply to the fine texture imparted to tissue by creping or microstraining, for such texture is generally due to local kinks and microcompressions in the fibers that may be relaxed when the tissue is wetted, causing the tissue to collapse toward a flatter state than it was in while dry.

Other methods are known in the art for protecting the strength of a paper web, such as when the paper web is wet. These methods, however, do little to protect the texture of the surface of the web while maintaining web strength. For example, wet strength agents may be used in tissue and other paper webs to help strengthen or protect fiber-fiber bonds of the web as it dries, but such agents do not protect additional texture imparted to the dry web by embossing, creping, microstraining, or similar processes. When an embossed web which has been treated with wet strength agents is wetted, the swelling of the fibers and/or the relaxation of stresses in the fibers tends to remove much of the embossed texture as the web returns to the topography that existed as the web initially dried when the wet strength agents became activated or cured.

Thus, there is a need for a method of converting a dry tissue web or other porous web into a structure having enhanced texture and physical properties. Moreover, there is a need for a highly textured paper product which may maintain a highly textured surface even after becoming wet.

Further, laminated products, such as laminated wiping products, for example, often experience delamination of plies during scrubbing. The use of binder fibers has been utilized in the past to join two textured webs, but this method sometimes results in weak spots where the binder fibers are scarce. Maintaining good uniformity of binder fibers between plies may be challenging, and getting good contact between the fibers and both adjacent tissue plies may also be challenging. Thus, there is a further need for a multi-ply wiping product which may maintain desired surface characteristics during use with improved contact between plies and less chance of ply delamination during use.

SUMMARY OF THE INVENTION

The present invention is directed to a process for forming a pattern of a highly textured material on a surface of paper web. In general, a viscous material such as a molten thermoplastic polymer may be printed onto a surface of a web with a low pressure printing process to form polymeric fibrils rising from the surface of the web. Generally, an applicator approaches the web and delivers the viscous material to the surface of the web in pattern, after which the distance between the applicator and the viscous material is increased, whereby the viscous material as it is in contact with both the applicator and the paper web is elongated therebetween, resulting in fibril formation under suitable conditions. The temperature of the viscous material and optionally the temperature of the applicator and the paper web may be controlled to maintain a proper degree of tack in the viscous material to allow fibrils to form and rapidly cool and solidify rather than coalesce. Cooling air may be applied to the web immediately after or during fibril formation. For example, a pressurized air source may apply a jet of room-temperature or chilled air to the fibrils after they are formed. Cooling air may also be applied to the backside of the fibrous web such that air rises from the web toward the fibrils, when the printed web is sufficiently permeable.

Methods for fibril formation on a fibrous web may be adapted from known principles for "tack spinning" for generating a uniform layer of fibrils on surface, as described in U.S. Pat. No. 4,451,419, issued May 29, 1984 to Bye et al.; U.S. Pat. No. 4,436,687, issued to Dye et al, Mar. 13, 1984; U.S. Pat. No. 4,183,889 issued to Brendel, 1980; U.S. Pat. No. 4,181,762 issued to Brendyk, 1980; U.S. Pat. No. 4,076,874, issued to Giovanelli, 1978; U.S. Pat. No. 3,976,820, issued to Giovanelli, Aug. 24, 1976; and U.S. Pat. No. 3,906,128 issued Sept. 16, 1975 to Burling and Steel; each of which are herein incorporated by reference to the extent they are not contradictory herewith. In contrast to the present invention, the tack spinning methods of Steel et al. in U.S. Pat. Nos. 3,696,183 and 3,870,778, issued Oct. 3, 1972 and Mar. 11, 1975, respectively, disclose a process for producing an article by pressing softened filament-forming thermoplastic polymeric material through a perforated web into contact with a heated surface to which the polymeric material sticks, parting the web and polymeric material from the heated surface so that filaments are produced and cooling the filaments to harden and disjoin them from the surface.

In one embodiment, the fibrous web after printing against a flexographic cylinder is pulled over a rod that controls the rate of separation of the web from the cylinder, similar to the principles taught for more conventional pile formation in U.S. Pat. No. 4,436,687, issued Mar. 13, 1984 to Bye et al., previously incorporated by reference (see particularly FIG. 5 therein). A jet of cooling air may be directed at the point of separation to rapidly cool the fibrils that are formed, as also disclosed in U.S. Pat. No. 4,436,687.

The fibrils produced according to the present invention may have a fibril length of about 0.1 mm or greater, such as from about 0.2 mm to about 12 mm, or from about 0.3 mm to about 6 mm, or from about 0.4 mm to about 4 mm. The fibril density may be about 70 fibrils per square centimeter or greater, specifically about 200 fibrils per square centimeter or greater, more specifically about 500 fibrils per square centimeter or greater, and most specifically about 1000 fibrils per square centimeter or greater, such as from about 100 to about 5000 fibrils per square centimeter, or from about 100 fibrils to about 1500 fibrils per square centimeter. Fibril length, as used herein, refers to the length of a free fibril, e.g., the distance from the base of fibril where the fibril is attached to the surface of a fibrous web to the unattached end of the fibril. If the base of the fibril is attached to a film of polymeric material on the surface of the fibrous web, the thickness of the film of the polymeric material is not considered to contribute to the length of the fibril. However, the thickness of the film of polymeric material does contribute to the thickness of the printed material above the surface of the fibrous web, which thickness may be about 0.1 mm or greater, more specifically about 0.2 mm or greater, more specifically still about 0.4 mm or greater, and most specifically about 0.5 mm or greater, such as from about 0.1 mm to about 2 mm, or about 0.2 to about 1.3 mm, or from about 0.2 mm to about 0.8 mm.

The diameter of the fibrils may be about 0.3 micrometers or greater, specifically about 1 micrometer or greater, more specifically about 3 micrometers or greater, and most specifically about 5 micrometers or greater, such as from about 1 micrometer to about 30 micrometers, or from about 2 micrometers to about 9 micrometers, or from about 0.5 micrometers to about 6 micrometers.

A heterogeneous pattern of printed fibrils may have two or more regions of fibrils that differ in fibril density (number of fibrils per square centimeter) and/or mean fibril length and/or fibril diameter, whether there are unprinted regions or not. For example, a first printed region may have fibrils with a mean length greater than about 0.6 mm, while a second printed region may have a mean length less than about 0.6 mm. The difference in mean length between the fibrils of a first and second region may be about 0.05 mm or greater, more specifically about 0.1 mm or greater, and most specifically about 0.2 mm or greater. The difference in fibril density in a first and second region may be about 100 fibrils per square centimeter or greater, more specifically about 200 fibrils per square cm or greater, and most specifically about 600 fibrils per square centimeter or greater. The difference in mean fibril diameter between a first and second printed region may be about 0.2 micrometers or greater, more specifically about 0.3 micrometers or greater, and most specifically about 1.5 micrometers or greater.

Applying the fibrils in a pattern may be achieved by applying the viscous material in a pattern to a printing surface, such as a flexographic cylinder, or by using a three-dimensional paper web that selectively contacts portions of the viscous material on a smooth surface, such that only the relatively most elevated portions of the three-dimensional tissue web are printed with the viscous material. Alternatively, a flat, two-dimensional paper web may be temporarily placed in a three-dimensional form due to contact with an underlying three-dimensional surface. In another embodiment, the fibrils may be formed in a uniform manner on a tissue surface, after which portions of the fibrillated surface are selected treated to remove the fibrils or to thermally coalesce them, such that the treated web has fibrils provided in a pattern.

When fibrils rise from one side of the web, the opposing (unprinted) side is generally substantially free of the viscous material used to produce the fibrils on the printed side.

Any known tissue or paper web may be used. In one embodiment, the web is a three-dimensional tissue web such as a textured uncreped tissue web, and specifically an uncreped through-air dried web. Uncreped through air dried tissue webs are described in U.S. Pat. No. 6,436,234, issued Aug. 20, 2002 to Chen et al.; U.S. Pat. No. 6,395,957, issued May 28, 2002 to Chen et al.; U.S. Pat. No. 5,656,132 issued to Farrington et al.; U.S. Pat. No. 5,772,845 to Farrington, Jr. et al., U.S. Pat. No. 6,017,417 issued to Wendt et al.; U.S. Pat. No. 5,429,686, issued to Chiu et al., issued Jul. 4, 1995; U.S. Pat. No. 5,399,412, issued Mar. 21, 1995 to Sudall and Engel; and U.S. Pat. No. 5,048,589 issued Sep. 17, 1991 to Cook and Westbrook, all of which are herein incorporated by reference.

Tissue webs may be creped. Pattern-densified or imprinted webs may be used, such as those of U.S. Pat. No. 5,904,811, issued May. 18,1999 to Ampulski et al.; U.S. Pat. No. 4,514,345, issued on Apr. 30, 1985 to Johnson et al.; U.S. Pat. No. 5,334,289, issued on Aug. 2, 1994 to Trokhan et al.; U.S. Pat. No. 4,528,239, issued on Jul. 9, 1985 to Trokhan; U.S. Pat. No. 5,098,522, issued on Mar. 24, 1992 to J. A. Smurkoski et al.; and U.S. Pat. No. 4,637,859, issued on Jan. 20, 1987 to Trokhan. Double print-creped webs may be used, such as those described in U.S. Pat. No. 3,879,257, "Absorbent Unitary Laminate-Like Fibrous Webs and Method for Producing Them," issued on Apr. 22, 1975 to Gentile et al., herein incorporated by reference.

The printing process may exert a peak printing pressure on the web of less than about 100 psi, more specifically between about 0.2 psi and about 30 psi, most specifically about 5 psi or less. For example, the low pressure printing process may be a flexographic printing process, an inkjet printing process, or a digital printing process.

The viscous material may be applied to the web in any desired pattern, including, for example, a pattern that is heterogeneous across the surface of the web.

In one embodiment, the viscous material may be printed on the web using a flexographic printing process wherein a printing nip is formed between two rolls, which may be interdigitating rolls. In such an embodiment, the web may also be shaped or softened in the printing nip, if desired. In another alternative, the web may be flexographically printed with only a flexographic plate, and no backing or impression cylinder is utilized. As the web is moved away from the flexographic cylinder, the tackiness of the viscous material is such that numerous strands of viscous material are formed, resulting in fibrils formed rising from the surface of the web.

The viscous material may be any fibril-forming suitable material that may be applied to the web using a printing process to have a nonuniform distribution on the fibrous web. Examples include known hot melts, silicone adhesives, and other curable adhesives including structural adhesives (epoxies, urethanes, etc.), UV-curable adhesives, and the like. The adhesives may be non-pressure sensitive adhesives (non-PSA). The fibrils formed during or immediately after printing may be cooled, for thermoplastic viscous materials, or cured or crosslinked, as appropriate, to solidify the fibrils before they coalesce with one another, preferably maintaining free ends of the fibrils that may provide a fuzzy feel to the web or other desirable properties.

Conventional flexographic inks for printing on paper typically have low viscosity, such as a viscosity of about 2 poise or less measured with a Brookfield viscometer at 20 revolutions per minute, or about 1 poise at infinite shear as determined by Casson plot. More viscous inks are known for use on textiles, wherein the inks may have viscosities of about 10–65 poise at 20 RPM on a Brookfield viscometer and about 3 to 15 poise at infinite shear as determined by Casson plot. Higher viscosity inks and pastes have also been disclosed for flexographic printing on textiles, however, according to the present invention, viscous material having still higher viscosities may be printed with flexographic means on an absorbent web and then converted to fibrils (fibrillated) and cured into a highly textured surface pattern.

For example, at the temperature of application, a hot melt applied to a tissue or airlaid web with flexographic means may have a viscosity measured at 20 rpm on a Brookfield viscometer of 20 poise (p) or greater, such as 30 p, 50 p, 100 p, 200 p, 500 p, 1000 p, 5,000 p, 10,000 p, 20,000 p, or greater. At infinite shear as measured using a Casson plot, the apparent viscosity of the viscous adhesive of the present invention may be, for example, 300 p, 800 p, 3,000 p, 8,000 p, 15,000 p, or greater. The viscosity values may apply to the hotmelt at the pool temperature (the temperature of the hotmelt immediately before it is applied to the flexographic cylinder), or may refer to viscosities measured at 150° C. Alternatively, hot melt materials for use in the present invention may have a viscosity evaluated at 195° C. of 1 poise to 300 poise (100 cp to 30,000 cp), more specifically from about 10 poise to 200 poise, and most specifically from about 20 poise to about 100 poise.

At room temperature, the viscous materials may behave as a solid. The melting point of the viscous material for use in the present invention may be, for example, 40° C., 60° C., 80° C., 100° C., 120° C., 150° C., 200° C., 250° C., 300° C., or greater. In certain embodiments, the melting point of the material may be from about 40° C. to about 200° C., more specifically from about 60° C. to about 150° C., and most specifically from about 60° C. to about 120° C.

Suitable fibril-forming thermoplastic polymers may include polymers and copolymers from vinyl chloride, vinyl acetate, acrylonitrile, styrene, butadiene, vinylidene chloride, ethylene and propylene, and condensation polymers, for example polyamide and polyesters, e.g. of glycols and aromatic dicarboxylic acids. Blends of fiber-forming thermoplastic polymer materials may also be used. Suitable hotmelts may include, but are not limited to, EVA (ethylene vinyl acetate) hot melts (e.g. copolymers of EVA), polyolefin hotmelts, polyamide hotmelts, pressure sensitive hot melts, styrene-isoprene-styrene (SIS) copolymers, styrene-butadiene-styrene (SBS) copolymers, ethylene ethyl acrylate copolymers (EEA), polyurethane reactive (PUR) hotmelts, and the like. In one embodiment, poly (alkyloxazoline) hotmelt compounds may be used. If desired, the hotmelt may be water sensitive or water-remoistenable. This may be desirable, for example, in an embodiment wherein the applied hotmelt may be moistened and then joined to another surface to bond the printed web to the other surface.

If desired, the viscous material may be printed on both sides of the paper web in a pattern. Similarly, other additives may also be printed on either or both sides of the paper web. In one embodiment, a duplex flexographic system or other two-sided printing systems are used to print viscous material and apply fibrils onto both surfaces of the web.

In one embodiment, the process of the present invention includes forming a paper web, printing a viscous material onto the surface of the web in a pattern, contacting the viscous material on the web with a second surface and removing the web from the second surface to form fibrils projecting from the surface of the web, and optionally cooling and/or further curing the viscous material.

In one embodiment, the web may be a ply in a multi-ply product. In this embodiment, the highly textured web surface may be an interior surface in a laminated product, and the texturing provided to the web surface by the processes of the present invention may improve the contact and thus the adherence between adjacent plies, limiting delamination of the multi-ply product during use.

The present invention is also directed to the paper products formed by the process. In one embodiment, the paper products may be dual zoned paper products which include highly absorptive areas as well as areas which include a hydrophobic material molded into a highly textured surface pattern. The highly textured surface may provide good wiping characteristics as well as a soft surface feel to the product.

In general, the web of the present invention may have a basis weight of between about 10 and about 200 gsm, specifically between about 15 and 120 gsm, more specifically between about 25 and 100 gsm, most specifically between about 30 an 90 gsm. The web may have a bulk greater than about 3 cc/g. More specifically, the web may have a bulk between about 3 and about 20 cc/g. The Frazier air permeability of the base web may generally be greater than about 10 cfm and more specifically greater than 100 cfm. The Frazier permeability of the treated web with fibrils rising from at least one surface may be about 10 cfm or greater, more specifically about 30 cfm or greater, and most specifically about 100 cfm or greater In one embodiment, the paper web may be a stratified web.

The added texturing on the web may produce formations projecting from the web surface so to form a three-dimensional structure of fibrous material on the surface of the web. For example, the material may form a three-dimensional structure including a multiplicity of polymeric fibrils extending above the web surface. The three-dimensional structure of the material may also form a scrubbing surface, a structure such as may be used as an attachment feature on a surface, a liquid drainage structure, or the like. In general, the three-dimensional structure of the material can have a maximum height above the planar surface of the web of about 0.5 mm or greater, about 1 mm or greater, or about 0.5 cm or greater. In one embodiment, the structures can extend from about 0.5 to about 1.5 cm above the planar surface of the web.

Definitions and Test Methods

As used herein, a material is said to be "absorbent" if it may retain an amount of water equal to at least 100% of its dry weight as measured by the test for Intrinsic Absorbent Capacity given below (i.e., the material has an Intrinsic Absorbent Capacity of about 1 or greater). For example, the absorbent materials used in the absorbent products of the present invention may have an Intrinsic Absorbent Capacity of about 2 or greater, more specifically about 4 or greater, more specifically still about 7 or greater, and more specifically still about 10 or greater, with exemplary ranges of from about 3 to about 30 or from about 4 to about 25 or from about 12 to about 40.

As used herein, "Intrinsic Absorbent Capacity" refers to the amount of water that a saturated sample may hold relative to the dry weight of the sample and is reported as a dimensionless number (mass divided by mass). The test is performed according to Federal Government Specification UU-T-595b. It is made by cutting a 10.16 cm long by 10.16 cm wide (4 inch long by 4 inch wide) test sample, weighing it, and then saturating it with water for three minutes by soaking. The sample is then removed from the water and hung by one corner for 30 seconds to allow excess water to be drained off. The sample is then re-weighed, and the difference between the wet and dry weights is the water pickup of the sample expressed in grams per 10.16 cm long by 10.16 cm wide sample. The Intrinsic Absorbent Capacity value is obtained by dividing the total water pick-up by the dry weight of the sample. If the material lacks adequate integrity when wet to perform the test without sample disintegration, the test method may be modified to provide improved integrity to the sample without substantially modifying its absorbent properties. Specifically, the material may be reinforced with up to 6 lines of hot melt adhesive having a diameter of about 1 mm applied to the outer surface of the article to encircle the material with a water-resistant band. The hot melt should be applied to avoid penetration of the adhesive into the body of the material being tested. The corner on which the sample is hung in particular should be reinforced with external hot melt adhesive to increase integrity if the untreated sample cannot be hung for 30 seconds when wet.

As used herein, a material is said to be "deformable" if the thickness of the material between parallel platens at a compressive load of 100 kPa is at least 5% greater than the thickness of the material between parallel platens at a compressive load of 1000 kPa.

"Water retention value" (WRV) is a measure that may be used to characterize some fibers useful for purposes of this invention. WRV is measured by dispersing 0.5 grams of fibers in deionized water, soaking overnight, then centrifuging the fibers in a 4.83 cm (1.9 inch) diameter tube with an 0.15 mm (100 mesh) screen at the bottom at 1000 gravities for 20 minutes. The samples are weighed, then dried at 105° C. for two hours and then weighed again. WRV is (wet weight-dry weight)/dry weight. Fibers useful for purposes of this invention may have a WRV of about 0.7 or greater, more specifically from about 1 to about 2. High yield pulp fibers typically have a WRV of about 1 or greater.

As used herein, the "wet:dry ratio" is the ratio of the mean cross-directional wet tensile strength divided by the mean cross-directional dry tensile strength. The absorbent webs used in the present invention may have a wet:dry ratio of about 0.1 or greater and more specifically about 0.2 or greater. Tensile strength in the cross-direction or machine direction may be measured using an Instron tensile tester using a 3-inch jaw width (sample width), a jaw span of 2 inches (gauge length), and a crosshead speed of 25.4 centimeters per minute after maintaining the sample under TAPPI conditions for 4 hours before testing.

Unless otherwise indicated, the term "tensile strength" as used herein means "geometric mean tensile strength" (note that wet tensile strength is generally measured in the cross-direction). Geometric mean tensile strength (GMT) is the square root of the product of the machine direction tensile strength and the cross-machine direction tensile strength of the web. The absorbent webs of the present invention may have a minimum absolute ratio of dry tensile strength to basis weight of about 0.01 gram/gsm, specifically about 0.05 grams/gsm, more specifically about 0.2 grams/gsm, more specifically still about 1 gram/gsm and most specifically from about 2 grams/gsm to about 50 grams/gsm.

As used herein, "bulk" and "density," unless otherwise specified, are based on an oven-dry mass of a sample and a thickness measurement made at a load of 0.34 kPa (0.05 psi) with a 7.62-cm (three-inch) diameter circular platen made under TAPPI conditions (73° F., 50% relative humidity) after four hours of sample conditioning. A stack of five sheets is used.

The sheets rest beneath the flat platen and above a flat surface parallel to the platen. The platen is connected to a thickness gauge such as a Mitutoyo digital gauge which senses the displacement of the platen caused by the presence of the sheets. Samples should be essentially flat and uniform under the contacting platen. The measured thickness of the stack is divided by the number of sheets to get the thickness per sheet. The macroscopic thickness measurement made in this manner gives an overall thickness of the sheet for use in calculating the "bulk" of the web. Bulk is calculated by dividing the thickness of five sheets by the basis weight of the five sheets (conditioned mass of the stack of five sheets divided by the area occupied by the stack which is the area of a single sheet). Bulk is expressed as volume per unit mass in cc/g and density is the inverse, g/cc.

As used herein, "local thickness" refers to the distance between the two opposing surfaces of a web along a line substantially normal to both surfaces. The measurement is a reflection of the actual thickness of the web at a particular location, as opposed to the micro-caliper.

"Brookfield viscosity" may be measured with a Brookfield Digital Rheometer Movel DV-III with a Brookfield Temperature Controller using Spindle #27.

A measure of the permeability of a fabric or web to air is the "Frazier Permeability" which is performed according to Federal Test Standard 191A, Method 5450, dated Jul. 20, 1978, and is reported as an average of 3 sample readings. Frazier Permeability measures the airflow rate through a web in cubic feet of air per square foot of web per minute or CFM.

A three-dimensional basesheet or web is a sheet with significant variation in surface elevation due to the intrinsic structure of the sheet itself. As used herein, this elevation difference is expressed as the "Surface Depth" which is the characteristic peak-to-valley depth of the surface, as measured by a non-compressive optical means such as CADEYES moiré interferometry that measures surface elevation over an approximately 38-mm square area with an x-y pixel density of about 500 by 500 pixels. For example, a creped surface with repeating crepe folds ranging from 30 to 60 microns in height (as measured with moiré interferometry) will have a surface depth of about 60 microns (peaks are excluded that occur due to obvious surface defects, optical noise, etc., to ensure that the measurement is representative of the sample). A molded tissue web with repeating unit cell structures having up to 150 microns in elevating difference across the unit cell will have a Surface Depth of about 150 microns

BRIEF DESCRIPTION OF THE FIGURES

A full and enabling disclosure of the present invention, including the best mode thereof to one of ordinary skill in the art, is set forth more particularly in the remainder of the specification, including reference to the accompanying figures in which.

Figure 1:
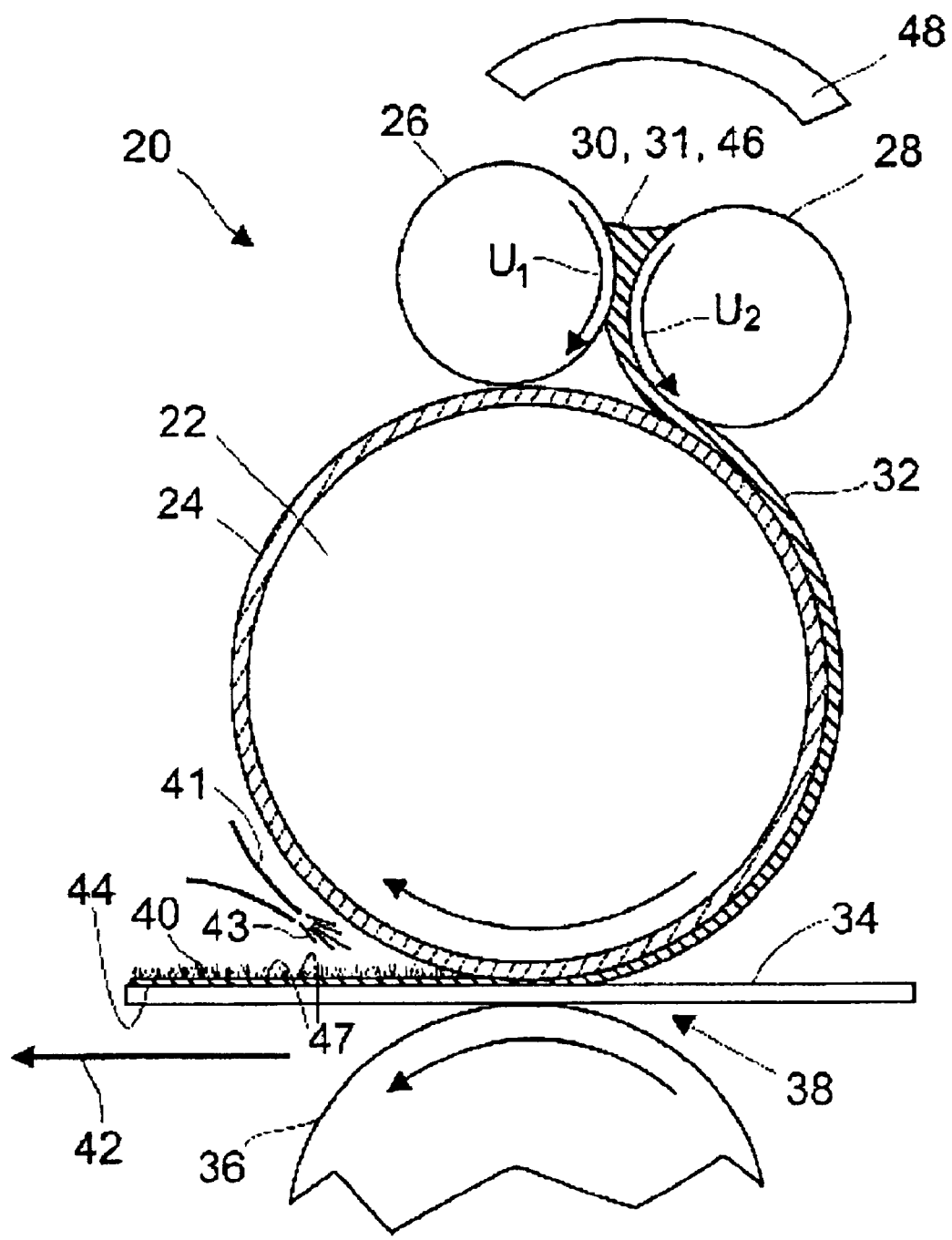
FIG. 1 depicts one embodiment of a flexographic printing and fibrillating apparatus suitable for use in the process of the present invention.

Repeat use of reference characters in the present specification and drawings is intended to represent same or analogous features or elements of the present invention.

DETAILED DESCRIPTION OF PREFERRED EMBODIMENTS

Reference now will be made in detail to embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations as come within the scope of the appended claims and their equivalents.

The present invention is generally directed to a process for producing an improved fibrous web and the webs produced by the process. The process of the present invention provides a method for adding three-dimensional texturing to a web surface by virtue of a viscous material which is printed onto the surface of the web in a manner that generates fibrils rising from the surface of the web in a pattern such that the web has a three-dimensional topography. This treatment may be applied to a fibrous web such as a tissue, an air laid web, or a fibrous nonwoven web. At some point after the viscous material is applied to the web surface in either a pattern or homogeneously and then altered to create a pattern, such that the fibrils formed from the viscous material are disposed in a macroscopically three-dimensional orientation.

If desired, a printed pattern of the viscous material may be designed to be heterogeneous across the face of the web, such that there are macroscopic regions of the web that are printed with different patterns and/or amounts of the viscous material. Such macroscopic patterns may be designed to further enhance the web characteristics, such as through enhanced tactile properties.

The printed pattern can be comprise regions free of viscous material and printed regions having a relatively constant basis weight of the viscous material, or there can be a plurality of regions having varying basis weights of the viscous material (e.g., gradients in basis weight can be present). For example, the unprinted area (open area) of the web can occupy 10% or more, 30% or more, or 50% or more of the surface area of the web, such as from about 25% to 90%, or 30% to about 70% of the surface area of the web. The pattern of either printed or unprinted regions (or first printed regions having higher or lower basis weights of applied viscous material than second printed regions of the viscous material) can define any known shape or pattern, such as polygons, circles, rectilinear grids, staggered arrays, ovals, diamonds, and representations of common objects such as flowers, animals, stars, hands, and the like. For example, elevated fibrils rising from the surface of a tissue web may be arrayed in a continuous network of lines or curves (e.g., sinusoidal curves) with isolated unprinted regions between the network of printed lines, or the unprinted regions can define a network of lines with islands of printed regions therebetween with fibrils rising from the surface of the islands.

In certain embodiments, the viscous material which may be printed onto the web surface may be a hydrophobic material. In these embodiments, the web product may be a dual zoned absorbent product, with those areas of the web not covered by the viscous material showing high absorptivity, and those area of the web which include the viscous material showing little or no absorptivity. In these embodiments, the absorption characteristics of the web may be controlled, with liquid being directed or shunted to the absorptive areas and away from the hydrophobic area. For example, dryer, hydrophobic areas may be preferred where the product is to be contacted by the skin of the consumer.

In various embodiments, the present invention may produce paper web products with increased bulk when both wet and dry. The present process may also increase the wet resiliency, the wet strength and improve the tactile properties of the paper products. In one embodiment, the treated web may maintain high bulk even when wet and under a compressive load, whereas without the applied viscous material, the molded web would be relatively flatter and would have a lower bulk, particularly when under load and wet.

Base webs that may be used in the process of the present invention may vary depending upon the particular application. In general, any suitable base web may be used in the process in order to improve the characteristics of the web. Further, the webs may be made from any suitable type of papermaking fibers.

"Papermaking fibers," as used herein, include all known cellulosic fibers or fiber mixes comprising cellulosic fibers. As used herein, the term "cellulosic" is meant to include any material having cellulose as a major constituent, and specifically comprising at least 50 percent by weight cellulose or a cellulose derivative. Thus, the term includes cotton, typical wood pulps, nonwoody cellulosic fibers, cellulose acetate, cellulose triacetate, rayon, thermomechanical wood pulp, chemical wood pulp, debonded chemical wood pulp, milkweed, or bacterial cellulose.

Fibers suitable for making the webs of this invention may include any natural or synthetic cellulosic fibers including, but not limited to nonwoody fibers, such as cotton, abaca, kenaf, sabai grass, flax, esparto grass, straw, jute hemp, bagasse, milkweed floss fibers, and pineapple leaf fibers; and woody fibers such as those obtained from deciduous and coniferous trees, including softwood fibers, such as northern and southern softwood kraft fibers; hardwood fibers, such as eucalyptus, maple, birch, and aspen. Woody fibers may be prepared in high-yield or low-yield forms and may be pulped in any known method, including kraft, sulfite, high-yield pulping methods and other known pulping methods. Fibers prepared from organosolv pulping methods may also be used. Useful fibers may also be produced by anthraquinone pulping. A portion of the fibers, such as up to 50% or less by dry weight, or from about 5% to about 30% by dry weight, may be synthetic fibers such as rayon, polyolefin fibers, polyester fibers, bicomponent sheath-core fibers, and the like. An exemplary polyethylene fiber is Pulpex®, available from Hercules, Inc. (Wilmington, Del.).

Synthetic cellulose fiber types include rayon in all its varieties and other fibers derived from viscose or chemically modified cellulose. Chemically treated natural cellulosic fibers may be used such as mercerized pulps, chemically stiffened or crosslinked fibers, or sulfonated fibers. For good mechanical properties in using papermaking fibers, it may be desirable that the fibers be relatively undamaged and largely unrefined or only lightly refined. While recycled fibers may be used, virgin fibers are generally useful for their mechanical properties and lack of contaminants. Mercerized fibers, regenerated cellulosic fibers, cellulose produced by microbes, rayon, and other cellulosic material or cellulosic derivatives may be used. Suitable papermaking fibers may also include recycled fibers, virgin fibers, or mixes thereof. In certain embodiments capable of high bulk and good compressive properties, the fibers may have a Canadian Standard Freeness of at least 200, more specifically at least 300, more specifically still at least 400, and most specifically at least 500.

As used herein, "high yield pulp fibers" are those papermaking fibers of pulps produced by pulping processes providing a yield of about 65 percent or greater, more specifically about 75 percent or greater, and still more specifically from about 75 to about 95 percent. Yield is the resulting amount of processed fiber expressed as a percentage of the initial wood mass. High yield pulps include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which contain fibers having high levels of lignin. Characteristic high-yield fibers may have lignin content by mass of about 1% or greater, more specifically about 3% or greater, and still more specifically from about 2% to about 25%. Likewise, high yield fibers may have a kappa number greater than 20, for example. In one embodiment, the high-yield fibers are predominately softwood, such as northern softwood or, more specifically, northern softwood BCTMP. The amount of high-yield pulp fibers present in the sheet may vary depending upon the particular application. For instance, the high-yield pulp fibers may be present in an amount of about 5 dry weight percent or greater, or specifically, about 15 dry weight percent or greater, and still more specifically from about 15 to about 30%. In other embodiments, the percentage of high-yield fibers in the web may be greater than any of the following: about 30%, about 50%, about 60%, about 70%, and about 90%. For example, the web may comprise about 100% high-yield fibers.

The paper web of the present invention may optionally be formed with other known paper making additives which may be utilized to improve the web characteristics. For example, paper webs formed with surfactants, softening agents, permanent and/or temporary wet strength agents, or dry strength agents are all suitable for use in the present inventive process.

As used herein, the term "surfactant" includes a single surfactant or a mixture of two or more surfactants. If a mixture of two or more surfactants is employed, the surfactants may be selected from the same or different classes, provided only that the surfactants present in the mixture are compatible with each other. In general, the surfactant may be any surfactant known to those having ordinary skill in the art, including anionic, cationic, nonionic and amphoteric surfactants. Examples of anionic surfactants include, among others, linear and branched-chain sodium alkylbenzenesulfonates; linear and branched-chain alkyl sulfates; linear and branched-chain alkyl ethoxy sulfates; and silicone phosphate esters, silicone sulfates, and silicone carboxylates such as those manufactured by Lambent Technologies, located in Norcross, Ga. Cationic surfactants include, by way of illustration, tallow trimethylammonium chloride and, more generally, silicone amides, silicone amido quaternary amines, and silicone imidazoline quaternary amines. Examples of nonionic surfactants, include, again by way of illustration only, alkyl polyethoxylates; polyethoxylated alkylphenols; fatty acid ethanol amides; dimethicone copolyol esters, dimethiconol esters, and dimethicone copolyols such as those manufactured by Lambent Technologies; and complex polymers of ethylene oxide, propylene oxide, and alcohols. One exemplary class of amphoteric surfactants is the silicone amphoterics manufactured by Lambent Technologies (Norcross, Ga.).

Softening agents, sometimes referred to as debonders, may be used in the present invention to enhance the softness of the tissue product. Softening agents may be incorporated with the fibers before, during or after dispersing. Such agents may also be sprayed, printed, or coated onto the web after formation, while wet, or added to the wet end of the tissue machine prior to formation. Suitable agents include, without limitation, fatty acids, waxes, quaternary ammonium salts, dimethyl dihydrogenated tallow ammonium chloride, quaternary ammonium methyl sulfate, carboxylated polyethylene, cocamide diethanol amine, coco betaine, sodium lauryl sarcosinate, partly ethoxylated quaternary ammonium salt, distearyl dimethyl ammonium chloride, polysiloxanes and the like. Examples of suitable commercially available chemical softening agents include, without limitation, Berocell 596 and 584 (quaternary ammonium compounds) manufactured by Eka Nobel Inc., Adogen 442 (dimethyl dihydrogenated tallow ammonium chloride) manufactured by Sherex Chemical Company, Quasoft 203 (quaternary ammonium salt) manufactured by Quaker Chemical Company, and Arquad 2HT-75 (dihydrogenated tallow) dimethyl ammonium chloride) manufactured by Akzo Chemical Company. Suitable amounts of softening agents will vary greatly with the species selected and the desired results. Such amounts may be, without limitation, from about 0.05 to about 1 weight percent based on the weight of fiber, more specifically from about 0.25 to about 0.75 weight percent, and still more specifically about 0.5 weight percent.

Typically, the means by which fibers are held together in paper and tissue products involve hydrogen bonds and sometimes combinations of hydrogen bonds and covalent and/or ionic bonds. In the present invention, it may be useful to provide a material that will allow bonding of fibers in such a way as to immobilize the fiber-to-fiber bond points and make them resistant to disruption in the wet state. In this instance, the wet state usually will mean when the product is largely saturated with water or other aqueous solutions, but could also mean significant saturation with body fluids such as urine, blood, mucus, menses, runny bowel movement, lymph and other body exudates.

There are a number of materials commonly used in the paper industry to impart wet strength to paper and board that are applicable to this invention. These materials are known in the art as "wet strength agents" and are commercially available from a wide variety of sources. Any material that when added to a paper web or sheet results in providing the sheet with a mean cross-directional wet tensile strength:dry cross-directional tensile strength ratio in excess of 0.1 will, for purposes of this invention, be termed a wet strength agent. Typically these materials are termed either as permanent wet strength agents or as "temporary" wet strength agents. For the purposes of differentiating permanent from temporary wet strength, permanent will be defined as those resins which, when incorporated into paper or tissue products, will provide a product that retains more than 50% of its original wet strength after exposure to water for a period of at least five minutes. Temporary wet strength agents are those which show less than 50% of their original wet strength after being saturated with water for five minutes. Both classes of material find application in the present invention. The amount of wet strength agent added to the pulp fibers may be at least about 0.1 dry weight percent, more specifically about 0.2 dry weight percent or greater, and still more specifically from about 0.1 to about 3 dry weight percent, based on the dry weight of the fibers.

Permanent wet strength agents will provide a more or less long-term wet strength to the product. n contrast, the temporary wet strength agents would provide products that had low density and high resilience, but would not provide a product that had long-term resistance to exposure to water or body fluids. The mechanism by which the wet strength is generated has little influence on the products of this invention as long as the essential property of generating water-resistant bonding at the fiber/fiber bond points is obtained.

Suitable permanent wet strength agents are typically water soluble, cationic oligomeric or polymeric resins that are capable of either crosslinking with themselves (homocrosslinking) or with the cellulose or other constituent of the wood fiber. The most widely used materials for this purpose are the class of polymer known as polyamide-polyamine-epichlorohydrin type resins.

With respect to the classes and the types of wet strength resins listed, it should be understood that this listing is simply to provide examples and that this is neither meant to exclude other types of wet strength resins, nor is it meant to limit the scope of this invention.

Although wet strength agents as described may be used in connection with this invention, other types of bonding agents may also be used to provide wet resiliency. They may be applied at the wet end of the basesheet manufacturing process or applied by spraying or printing after the basesheet is formed or after it is dried.

The manner in which the base web of the present invention is formed may also vary depending upon the particular application. For example, the web may contain pulp fibers and may be formed in a wet-lay process according to conventional paper making techniques. In a wet-lay process, the fiber furnish is combined with water to form an aqueous suspension. The aqueous suspension is spread onto a wire or felt and dried to form the web.

In one embodiment, the web may be formed from an aqueous suspension of fibers, as is known in the art, and then pressed onto the surface of a rotatable heated dryer drum, such as a Yankee dryer, by a press roll. As the web is carried through a portion of the rotational path of the dryer surface, heat is imparted to the web causing most of the moisture contained within the web to be evaporated. The web is then removed from the dryer drum by a creping blade. Creping the web as it is formed reduces internal bonding within the web and increases softness.

In an alternative embodiment, instead of wet pressing the base web onto a dryer drum and creping the web, the web may be through-air dried. A through-air dryer accomplishes the removal of moisture from the base web by passing air through the web without applying any mechanical pressure.

Alternatively, the base web of the present invention may be air formed. In this embodiment, air is used to transport the fibers and form a web. Air-forming processes are typically capable of processing longer fibers than most wet-lay processes which may provide an advantage in some applications.

The process of the present invention is generally applicable for any formable base web. In one embodiment, the base web may have a basis weight between about 10 and about 80 gsm. Additionally, the base web may be fairly porous and may have a Frazier air permeability of greater than about 10 cfm. Moreover, the base webs of the present invention may be absorbent base webs, with an Intrinsic Absorbent Capacity of greater than about 2 g $H_2O$/g. More specifically, webs suitable for processing according to the present invention may have an Intrinsic Absorbent Capacity of greater than about 5 g $H_2O$/g.

The initial bulk of the base web may be great or small, as desired. For example, in one embodiment, the base web may be a relatively low bulk base web, with a bulk of less than 10 cc/g and a Surface Depth of less than about 0.2 mm, more particularly less than about 0.1 mm. For example, the base web may have a bulk of between about 3 and about 10 cc/g, more specifically between about 5 and about 10 cc/g. In an alternative embodiment, the base web may be a relatively high bulk web, prior to subjection to the process of the present invention. For example, the base web may have a bulk between about 10 cc/g and about 20 cc/g.

If desired, the base web may be formed from multiple layers of a fiber furnish. Both strength and softness may be achieved through layered webs, such as those produced from stratified headboxes. In one embodiment, at least one layer delivered by the headbox comprises softwood fibers while another layer comprises hardwood or other fiber types. Layered structures produced by any means known in the art are within the scope of the present invention. For example, in one embodiment, a paper web with high internal bulk and good integrity of the surfaces may be formed which may include a small portion of synthetic binder fibers present in the web, and the web may have a layered structure with a weak or debonded middle layer and relatively stronger outer layers. For example, outer layers may comprise refined softwood for strength, and the middle layer may comprise over 30% high-yield fibers such as CTMP that have been treated with a debonder. In addition, long synthetic binder fibers, such as bicomponent sheath-core fibers, may be used.

In one embodiment, some of the fibers may extend across the middle layer to provide z-direction strength to the web.

In one embodiment, high bulk may be imparted to the web by the use of bicomponent fibers that curl when heated. This may be especially useful in a middle layer, though fibers that curl when heated could be added anywhere to the web.

In accordance with the present invention, any of a variety of low pressure printing technologies may be utilized to print a viscous material onto a paper web. In the present disclosure, low pressure printing technologies are generally considered to be those in which the peak pressure applied to the web during the printing process is such that it will not substantially densify the web. Exemplary peak pressures may be any of the following: about 100 psi or less, about 50 psi or less, about 20 psi or less, about 10 psi or less, about 5 psi or less, about 2 psi or less, about 1 psi or less, and about 0.8 psi or less. The same ranges may be applied to the mean pressure on the web during contact with a printing device.

In general, the viscous material may be printed onto the web to form a pattern. The printing pattern generally includes areas of the surface of the web which are substantially free of the viscous material. At some point after printing the viscous material, the viscous material may be molded to a more three-dimensional aspect and finally cured so as to provide areas of increased texturing on the surface of the web. The presence of the cured material on a web which is highly textured itself may additionally give the textured web a degree of resiliency against collapse when wet as well as when placed under a load. In other words, the three-dimensional structure of the web itself may be less likely to relax back into a flatter plane due to the presence of the cured material which has been printed on the web.

The added texturing of the base web with fibrils formed from viscous material may provide a soft, velvet-like nap to the web surface while providing a high quality wiping surface. In an alternative embodiment, the printed material may be formed into larger more abrasive fibrils, which, while not necessarily increasing the soft feel of the web surface, can provide good scrubbing characteristics to the web. Various molding tools may be employed to form isolated structures on the web surface. For example, precision abrasive scrub surfaces may be formed on the web surface. In one embodiment, a rotary molding tool may be employed which may form specifically shaped components on the web surface, such as, for example, hook components which may be used in a mechanical fastener or attachment. In one embodiment, molded fasteners could be used to attach the web to another surface, such as the surface of a cleaning tool or an attachment on a personal care product or a cleaning mitt, for example.

In one embodiment, the web may be a highly textured web in its own right, that is, a web which has an increased three-dimensional profile added such as through a web shaping process. For example, in one embodiment, the web can be a through-air dried web which is dried on a highly textured forming fabric, such that the web is formed against the forming fabric and takes on the texturing of the forming fabric. In an alternative embodiment, the web can be embossed so as to add bulk and an increased three-dimensional profile to the web. In such an embodiment, the low pressure printing process of the present invention may be carried out either before, during, or after the web is formed into the desired three-dimensional state. For example, in one embodiment, the web may be formed into a highly textured state and then, either while the web is held in the textured state or alternatively prior to the web relaxing out of the highly textured state, the viscous material may be printed onto the web in the desired pattern. Alternatively, the viscous material may be printed onto the web in a pattern and then the web may be shaped against a three-dimensional substrate before the viscous material finally cures. For example, in one embodiment, the viscous material may be printed on the web, and then the web may be pressed against a highly textured substrate such as with a pneumatic force, but preferably after the fibrils have solidified enough to prevent coalescence. Alternatively, the web may be shaped so as to have a more three-dimensional profile and the viscous material may be applied to the web at the same time.

In one embodiment, the presence of the viscous material may help to 'lock in' the three-dimensional profile of the web. For example, the pattern of viscous material may partially overlap or may even coincide completely with areas of high or low elevation on the web surface. For instance, in one embodiment the viscous material may be applied to the web in a pattern which substantially corresponds to the low elevation areas of the three-dimensional state of the web.

For application of the viscous material with flexographic printing, any known commercial flexographic equipment may be used, though in some embodiments it may be necessary to be adapted for the present invention. For example, equipment may be provided by Fulflex Inc., (Middletown, R.I.). In one embodiment, Fulflex's real time digital direct-to-plate laser engraving system (Direct Digital Flexo or DDF) may be used to prepare the flexographic plate. Fullflex Laserflex® image transfer materials may also be applied.

Generally, the web will be dry (e.g., about 92% solids or greater), but printing on a moist web is not necessarily outside the scope of the present invention. For example, the web may have a moisture content of 5% or greater, 10% or greater, or 20% or greater, such as from about 5% to 50%, or from 10% to 25%.

FIG. 1 depicts one possible embodiment of a flexographic printing apparatus 20 suitable for printing a viscous material 30 onto an absorbent web 34 and subsequently fibrillating (or tack spinning) the viscous material according to the processes of the present invention. As may be seen, the plate cylinder 22 may be covered with a flexographic plate 24 which may be engraved or otherwise textured (not shown) with a pattern of raised elements. The flexographic plate 24 typically comprises an elastomeric material, though this is not a requirement of the present invention. For example, the flexographic technology may use rubber rolls, if desired, including those formed of photocured rubber resins, polyesters, or other polymers known in the art, including EPDM nitrile, nitrile PVC, carboxylated nitrile, hydrogenated nitrile, Hypalon, and silicone elastomers. In general, in order to fibrillate the viscous material as it exits the printing nip, the flexographic plate 24 should be formed of a material which may slightly adhere to the viscous material.

In a flooded nip 31 between an applicator roll 28 and a counter-rotating roll 26 (typically a rubber roll or doctor roll), a pool 46 of a viscous material 30 is maintained. Either or both of the rolls 26, 28 may be internally heated. An infrared heater or other heat source 48 may also be applied to control the temperature of the pool 46 of viscous material 30, and thus control the viscosity. The counter-rotating roll 26 may help control the delivery of the viscous material 30 to plate 24 and typically may rotate at a lower velocity $U_1$ than the velocity $U_2$ of the applicator roll. In general, the ratio $U_1/U_2$ may be from 0.1 to 0.9, more specifically from about 0.2 to 0.6, and most specifically from about 0.3 to about 0.5.

The applicator roll 28 may be substantially smooth, for example a chrome plated steel roll, a ceramic roll, or a roll with a polymeric cover, or alternatively may be a textured roll, such as an engraved anilox roll of any variety known in the art. The counter-rotating roll 26 generally is smooth, but may also be textured if desired and may comprise any material known in the art.

The viscous material 30 that follows the applicator roll 28 is transferred to the upper portions of the flexographic plate 24. The thickness of the film of viscous material applied to the flexographic plate 24 on the plate cylinder 22 may be governed by controlling roll speeds, material and roll temperature, application rate, adhesive viscosity as well as other factors.

In one embodiment, the viscous material is printed by a flexographic plate at a temperature of about 50° C. or higher, specifically about 70° C. or higher, more specifically about 100° C. or higher, and most specifically about 120° C. or higher. The flexographic plate may be heated by infrared radiation, internal heating in the flexographic cylinder, by the application of sufficiently hot viscous material, and the like.

The viscous material 30 applied to the flexographic plate 24 forms a printing layer 32 on the elevated portions of the flexographic plate 24. The printing layer 32 may have a thickness of about 0.03 mm or greater, such as from about 0.05 mm to 2 mm, more specifically from about 0.1 mm to about 1 mm, and most specifically from about 0.2 mm to about 0.7 mm. The printing layer 32 enters a nip 38 between the plate cylinder 22 and an opposing impression cylinder 36 which holds the web 34 against the flexographic plate 24 as it passes through the nip 38, allowing the viscous material 30 in the printing layer 32 to be applied to the web 34 in a predetermined pattern (not shown).

The mechanically applied pressure in the nip 38 is typically less than that applied in gravure printing and generally does not substantially densify the web 34. For example, the applied load may be expressed in terms of pounds per linear inch and may be less than 200 pli such as from about 0.2 pli to 200 pli, more specifically from about 1 pli to about 60 pli, and most specifically from about 2 pli to about 30 pli, or alternatively, less than about 3 pli. The peak pressure applied to the web 34, as measured with pressure-sensitive nip indicator films, may be less than 100 psi, such as from about 0.2 psi to about 30 psi, more specifically from about 0.5 psi to about 10 psi, and most specifically from about 1 psi to about 6 psi, or alternatively, less than 10 psi or less than 5 psi.

The web 34 travels in the machine direction 42 through the nip 38 and receives printed material 32 in a pattern on a surface 44. Although the printed material is depicted as continuous in FIG. 1, any number of continuous and discontinuous patterns is contemplated. The pattern may define a continuous network of viscous material 30 or isolated islands of viscous material 30, a combination thereof, or the like. For example, the pattern may be designed to correspond to low elevation areas of a high profile web.

The thickness of the printed material 32 relative to the surface 44 of the web 34 may be vary over a wide range of obtainable values. Without limitation, the thickness may be about 1 millimeter or less, specifically about 0.5 mm or less, more specifically about 0.25 mm or less microns, more specifically still about 0.1 mm or less, and most specifically about 0.05 mm or less, with exemplary ranges of from 0 to 0.1 mm, from 0.05 mm to 1 mm, or from 0.1 mm to 0.4 mm.

As illustrated in FIG. 1, as the web leaves the printing nip, the viscous material 32 which has been printed on the web may still be in a molten state and may adhere slightly to the flexographic plate 24. For example, a thermoplastic material may be at least about 2° C., 5° C., or 10C above the melting point of the material as the web exits the printing nip. As the printed web is pulled away from the surface of the flexographic plate 24, the viscous material 32 may be pulled away from the flexographic plate and fiberized (elongationally extended) to form one or more regions comprising a multiplicity of fibrils 47 attached to the printed material 40 on the web surface 44, said regions defining a pattern. This fiberization process is similar to the process of 'tack spinning' as described in U.S. Pat. No. 3,708,565 to Seiffert, which is herein incorporated by reference thereto as to all relevant material. The surface material of the flexographic plate 24 is such that there is a very slight adhesion between the plate surface 24 and the viscous material 32, but once the printed surface of the web 34 has been pulled away from the plate, little or no residue of the viscous material is left on the flexographic plate.

After the viscous material has been fibrillated, it may be set or cured while still in the fibrillated state. In one embodiment, a nozzle 41 may be located immediately downstream of the printing nip 38 in order to send a stream of an inert gas, such as air, for example, toward the fibrils exiting the printing nip. The turbulence imparted to the fibrils by the air stream 43 may aid in separating the fibril ends from the flexographic plate and elongate the fibrils as well as, in certain embodiments, serving to cure the material while in the fibrillated state. For example, when the viscous material is a thermoplastic material, the air stream 43 may be at a relatively low temperature in order to cure the material. Other curing methods could alternatively be utilized however, such as curing by application of light, such as UV light, for example, or, in the case of thermoset viscous materials, through application of thermal energy such as with a stream of heated gas.

The length and diameter of the formed fibrils may depend on the viscous material used, the delivery pressure of the air stream, the angle formed between the web 34 and the flexographic plate 24 as the web 34 leaves the nip 38, and the temperature, material, and velocity of the flexographic plate, among other process parameters. In general, fibrils having a length of between about 0.2 and about 1.5 cm may be formed by the process.

In an alternative embodiment (not shown), the impression cylinder 36 is removed and the web 34 is simply wrapped around a portion of the flexographic plate 24, such that the force applied to contact the web 34 to the flexographic plate 24 is provided by the tension in the web 34, and such that the contact time between the web 34 and the flexographic plate 24 is correspondingly larger due to a contact length that may be much greater than the nip length in the nip 38. Such an embodiment is known as "kiss coating." The low application pressure may help keep the coating material 30 on the surface 44 of the web 34 in this non-compressive process. This keeps the material on the upper surface of the web. Kiss coating may also be done with a gravure cylinder (not shown), an applicator roll 28, or other cylinder-containing adhesive for non-compressive printing to the web 34. In one embodiment, kiss coating is done with an applicator roll 28 (e.g., an anilox roll) with a surface pore volume of 2 billion to 6 billion cubic microns per square inch (BCM). For kiss coating or any other embodiment, digital drives and control systems may be used to maintain proper speed of all components.

Figure 2:
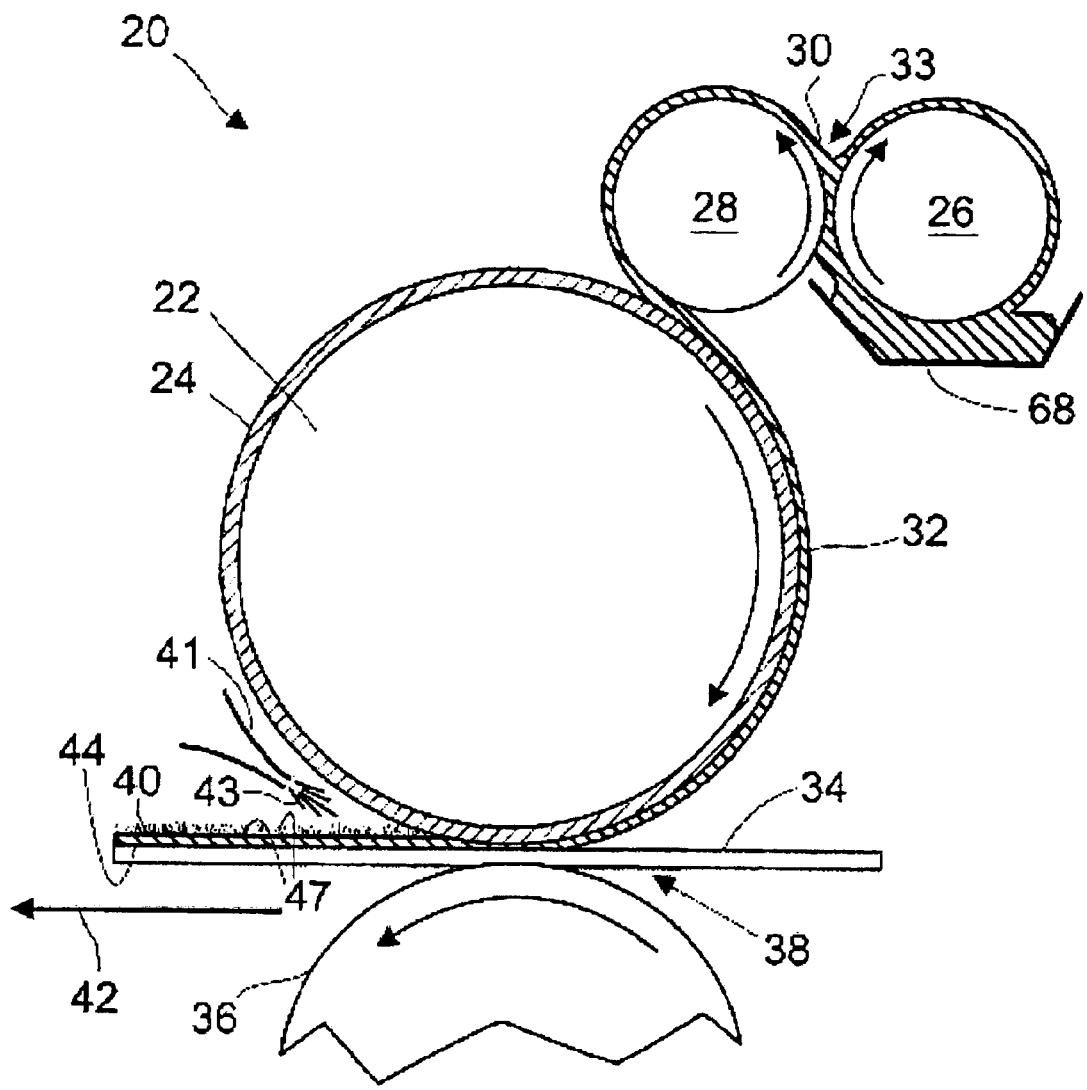
FIG. 2 depicts another embodiment of a flexographic printing and fibrillating apparatus suitable for use in the process of the present invention.

FIG. 2 is a schematic of another embodiment of a flexographic printing and fibrillating apparatus 20 suitable for use in the process of the present invention. The flexographic printing apparatus 20 employs a metered nip 33 between two counter-rotating rolls 26, 28. viscous material 30 may be applied to the counter-rotating roll 26 via any means such as a nozzle (not shown) through which the viscous material 30 is applied. Excess viscous material 30 may be collected in a tray 68. viscous material 30 may also be applied by contact of the counter-rotating roll 26 with viscous material 30 in the tray 68. As the printed web 34 is pulled away from the surface of the flexographic plate 24 after exiting the printing nip 38, the viscous material 32 may be pulled and fibrillated to form a multiplicity of fibrils 47 on the web surface 44, which are part of the layer of printed material 40 on the web 34.

Figure 3:
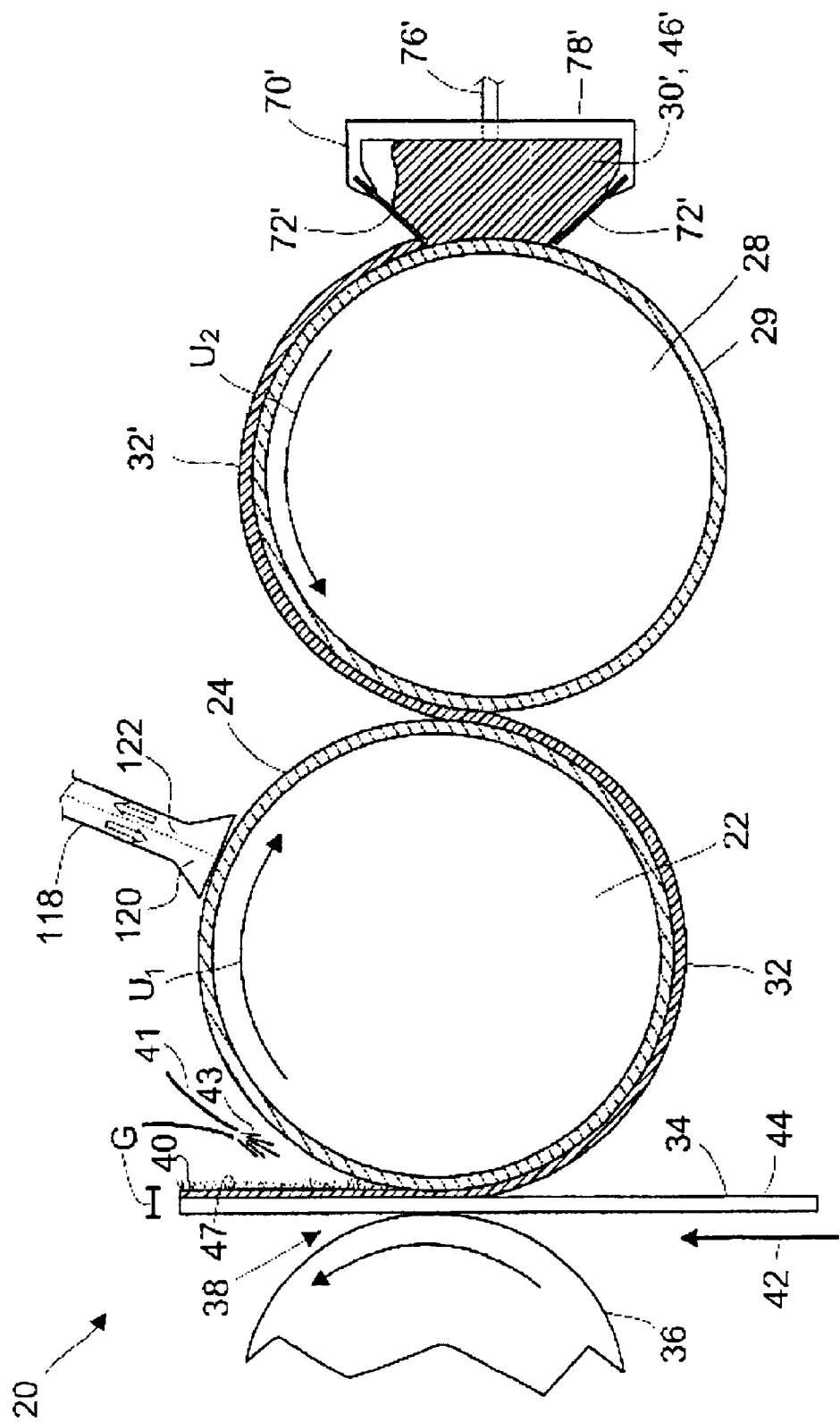
FIG. 3 depicts another embodiment of a flexographic printing and fibrillating apparatus suitable for use in the process of the present invention.

FIG. 3 depicts another embodiment of a flexographic printing and fibrillating apparatus 20 for use in the processes of the present invention. The viscous material 30' is applied to the flexographic plate 24 by means of an applicator roll 28 which receives a metered coating of viscous material 32' (or viscous material 30' applied to depressions in the surface of the applicator roll 28) by means of an enclosed application chamber 70' having a chamber body 78' connected to an inlet tube 76' for receiving viscous material 30' in flowable form (e.g., a liquid or a slurry), and further provided with a leading blade 72' and a trailing blade 72' for keeping the viscous material 30' in a pool 46' in contact with the cover 29 of the applicator roll 28. The trailing blade 72' is adjusted to meter a desired amount of the viscous material onto the applicator roll 28. Optionally, the application chamber 70' may be heated and maintained at a substantially constant temperature with temperature control means (not shown) to provide the viscous material 30' at a desired viscosity.

The applicator roll 28 is depicted as having a polymeric cover 29 which may be deformable, such as a high-temperature elastomeric material.

The flexographic cylinder 22 rotates at a first velocity $U_1$ (velocity being measured at the outer surface of the roll), while the applicator roll 28 rotates at a second velocity $U_2$. The second velocity $U_2$ can be substantially less than the first velocity $U_1$ for metering of the coating of viscous material 32', 32 to the flexographic plate 24. For example, the ratio $U_2/U_1$ may be from about 0.2 to 1, more specifically from about 0.4 to 0.8, and most specifically from about 0.4 to about 0.7.

As the printed web 34 is pulled away from the surface of the flexographic plate 24, the viscous material 32 may be pulled and fibrillated to form a multiplicity of fibrils 47 on the web surface 44.

The flexographic cylinder 22 may be cleaned to remove excess viscous material 30' still on the flexographic plate 24 after printing and fibrillating the viscous material on the web 34 at the nip 38. A plate cleaner 118 may be used which comprises an inlet line 120 conveying a cleaning material (not shown) to the surface of the flexographic plate 24, in cooperation with an adjacent vacuum line 122 for removing the cleaning material and excess viscous material 30' conveyed thereby. The cleaning material may be a solvent, including water (e.g., a spray of water droplets or water jets) or steam, for water-soluble adhesive materials (e.g., water soluble hot melts) or water-based emulsions (e.g., a latex). The cleaning material may also be an organic solvent or other materials. Commercial plate cleaners may be used, such as Tresu Plate Cleaners (Tresu, Inc., Denmark) or the plate cleaners of Novaflex, Inc. (Wheaton, Ill.).

In one embodiment, the viscous material may be printed onto both surfaces of the base web. For example, two printing steps may be used to provide printing of viscous material to both surfaces of the web. Alternatively, an interdigitated system such as that shown in FIG. 4 may be used, and the impression cylinder may also serve as a plate cylinder such that adhesive materials may be printed on both sides of the web in a single printing step. Printing both sides of the web in patterns that are staggered with respect to each other may provide both strength and good flexibility in the web. Alternatively, two sided printing may be done such that the two patterns on the opposing surfaces of the web align with each other, so that printed regions on one side are directly opposite printed regions on the opposing side. Alternatively, the printed patterns on the two sides of the web may be substantially different, such that there are random regions with and without adhesive overlap on the two sides.

Figure 7:
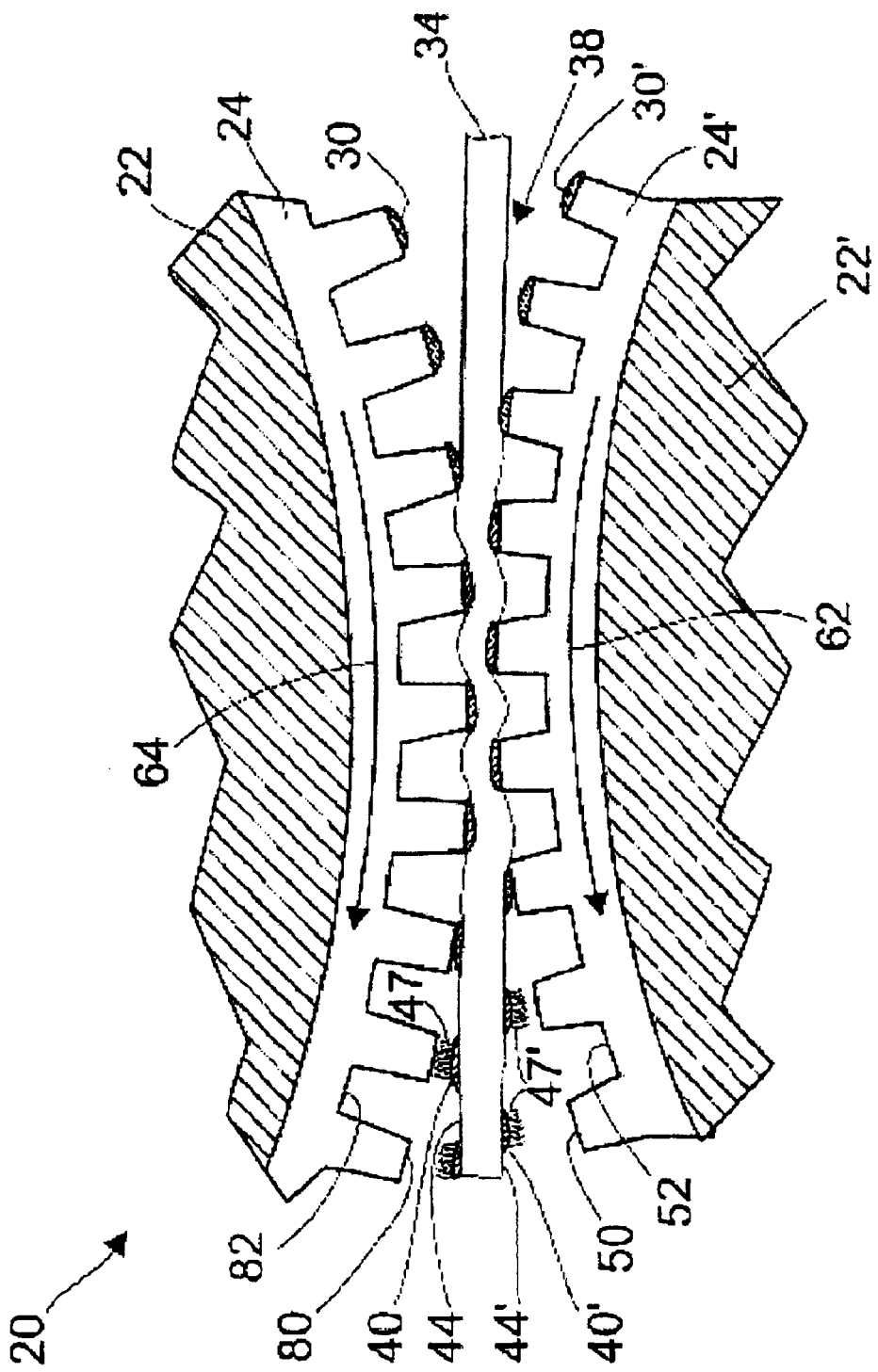
FIG. 7 is a schematic of an embodiment of a duplex flexographic nip as a web is printed with viscous material followed by fibrillating of the material on both sides of the web.

FIG. 7 depicts an embodiment of a duplex flexographic printing apparatus 20 in which first and second viscous materials 30, 30' are applied simultaneously to both sides of a web 34 as the web 34 contacts firsts and second flexographic plates 24, 24', respectively, in a nip 38 between first and second cylinders 22, 22', respectively. As the web exits the printing nip 38, the viscous materials printed on each side of the web 34 are fibrillated so as to form a surface of printed deposits 40 and 40' comprising fibrils 47 and 47' on both sides of the web. Alternatively, the viscous material on only one surface may be fibrillated, leaving the material on the second surface as printed. As shown, the patterns on first and second flexographic plates 24, 24' are not aligned but are skewed such that the deposits 40, 40' on the first and second surfaces 44, 44', respectively, of the web 34 are generally not directly above or beneath each other, but are staggered relative to each other. In other embodiments, the patterns on the opposing flexographic plates 24, 24' could be aligned or could randomly vary relative to each other. When the first and second flexographic plates 24, 24' are identical, one may be rotated with respect to the other, if desired, to prevent printing of identical overlapping patterns on both sides of the web 34, or they may be aligned such that identical overlapping patterns are printed.

Figure 8:
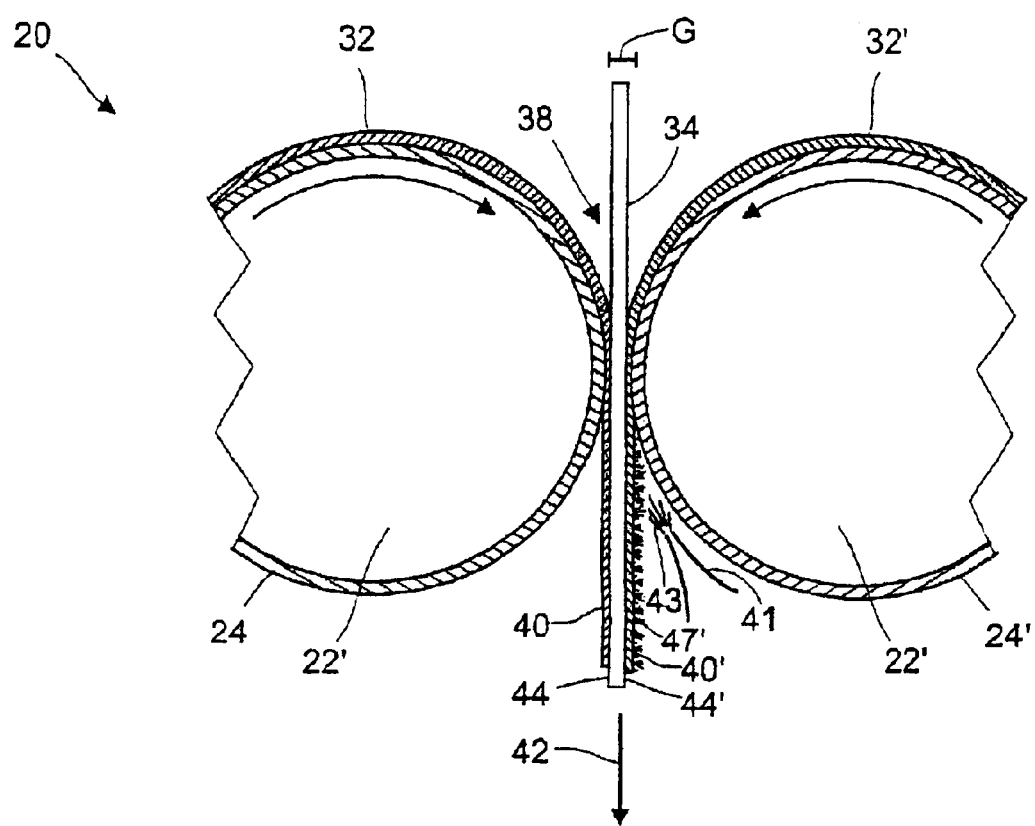
FIG. 8 depicts an embodiment of a flexographic printing and fibrillating system wherein a web is printed with viscous material on both sides of the web and the material is immediately fibrillating on only one side of the web.

FIG. 8 depicts another embodiment of a flexographic printing and fibrillating apparatus 20 for use in the processes of the present invention. The apparatus 20 operates in duplex flexographic mode with similar equipment on both sides of the web 34, including opposing first and second plate cylinders 22, 22', with first and second flexographic plates 24, 24' upon which first and second adhesive materials 32, 32' have been provided, respectively by any means, such as by transfer of the adhesive materials 30, 30' from applicator rolls (not shown) as in a duplex four-roll flexo system. The respective applicator rolls (not shown) that cooperate with the first and second flexographic plates 24, 24' may receive the viscous material 32, 32' by any means known in the art, such as by a spray, a curtain of melt or liquid flowing onto the applicator rolls, transfer from a flooded nip or metered nip with a counter-rotating roll (not shown), contact with adhesive materials 32, 32' in a tray or enclosed chamber, delivery of the viscous material through the interior chamber of a sintered roll to the surface thereof, from which the viscous material is transferred to the flexographic plates 24, 24', and so forth. The first and second flexographic plates 24, 24' are separated by a gap offset G which may be adjusted to prevent substantial densification or crushing of a high-bulk web 34. When the flexographic plates 24, 24' receive viscous material 32, 32' from applicator rolls in fluid communication with an enclosed chamber (not shown), the printing equipment configuration on both sides of the web 34 may resemble that shown for printing and fibrillating on one side of the web 34 in FIG. 3.

The viscous material 32' applied to the first surface of the web 44' is fibrillated to form a multiplicity of fibrils 47' which are shaped and cured via an air stream 43' delivered from a nozzle 41'. The viscous material 32 applied to the second surface of the web 44 is not fibrillated at the printing nip in this particular embodiment. As can be seen, fibrils may begin to form at the surface as the web 34 exits printing nip 38, but barring the presence of a means for curing the viscous material, the nascent fibrils relax back into a flat surface, and the layer of applied viscous material 45, is not molded into a more three-dimensional structure at the printing nip 38.

Unlike the method of driving ink transfer in conventional flexography, the process of the present invention may print a viscous material onto a web surface with very little or even no additional pressure at a printing nip of a printing apparatus. For instance, in some embodiments, the viscous material-bearing surfaces of the plate cylinder need not press against the web as it resides on a smooth impression cylinder. Local web tension as the web is held by raised elements on the plate cylinder may suffice to cause suitable web contact against the viscous material to permit transfer of the viscous material onto the surface of the web. As such, in some embodiments, the printing process may be carried out with a flexographic printing apparatus which does not include an impression cylinder at all.

In one embodiment, a variation of flexographic printing may be applied in which the web is formed into a more three-dimensional state at the same time as it is printed with viscous material. For example, the impression cylinder may be textured to approximate a reverse image of the plate cylinder, such that the web is shaped as the raised viscous material-bearing portions of the plate cylinder push the web into small depressions of the impression cylinder. In one sense, the flexographic plate on the plate cylinder and the impression cylinder could be considered interdigitating rolls. In such an embodiment, wherein the flexographic plate and the impression cylinder are both textured so as to increase the three-dimensional profile of the web, the hardness of both rolls as well as the texture of the rolls may be optimized for optimum printing and forming of the web. For example, the Shore A hardness of either roll may exceed 40, 60, or 80 in such an embodiment. In addition, a combined printing and forming step may be followed or preceded by additional processes as are known in the art to achieve the desired tactile properties.

Figure 4:
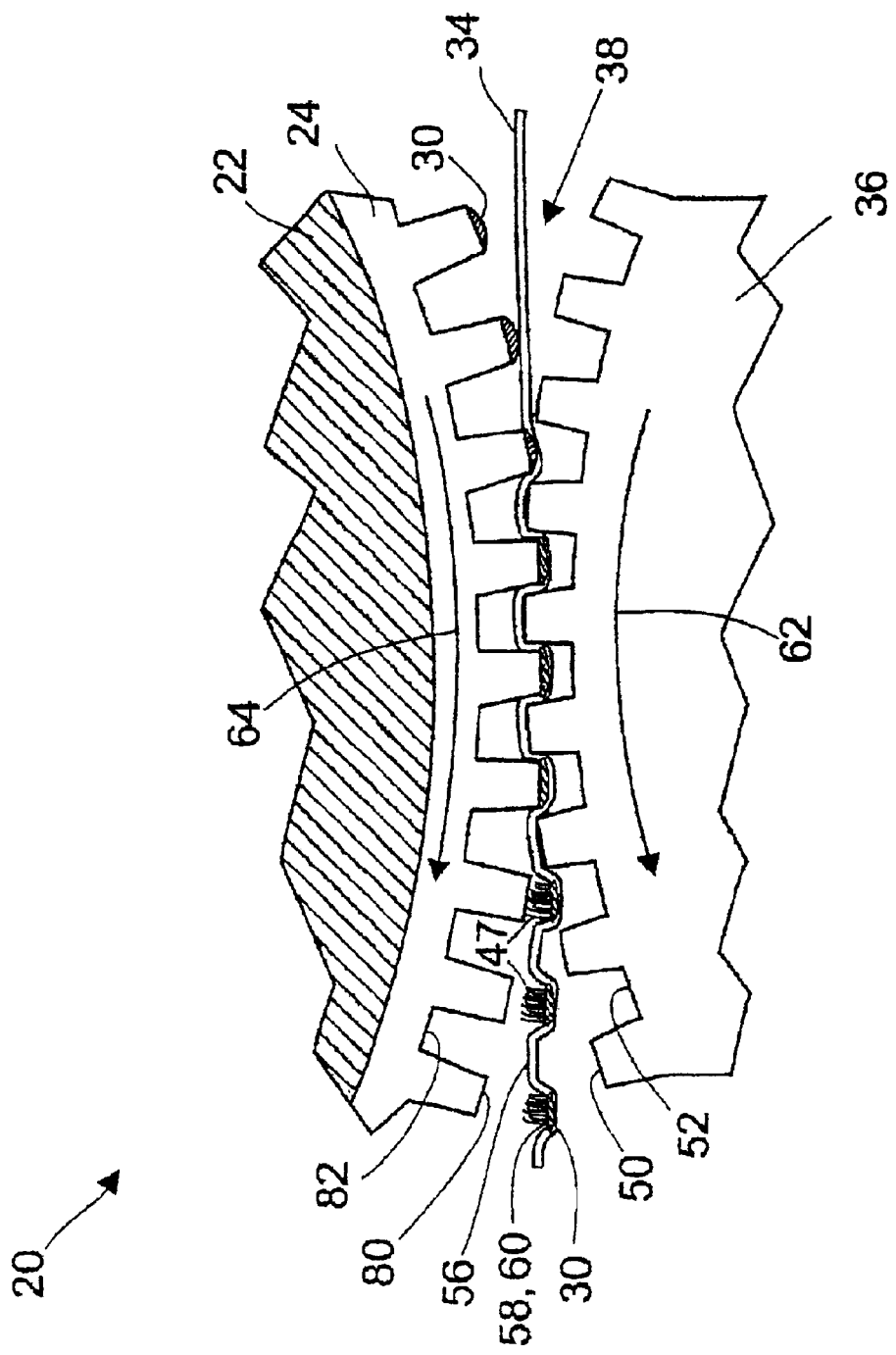
FIG. 4 depicts one embodiment of an interdigitating nip in a flexographic printing and fibrillating system.

FIG. 4 illustrates a nip 38 in which printing and fibrillating of a viscous material 30 and shaping of a web 34 may occur simultaneously. The nip 38 is formed between the plate cylinder 22, covered with a flexographic plate 24, and an opposing impression cylinder 36 which has a textured surface with protrusions 50 and recessed portions 52 that interdigitate with the textured flexographic plate 24 which also has protrusions 80 and recessed portions 82. The protrusions 80 of the flexographic plate 24 may then be coated with the desired viscous material 30 which may be transferred in the nip 38 to the web 34 to form a network (not shown) of viscous material 30 in the depressed portions 58 of the web 34, while providing isolated elevated portions 56 of the web 34 that are substantially free of the viscous material 30. As the web 34 leaves the nip 38, the applied viscous material can be pulled and fibrillated into multiple fibrils 47 in the depressed portions of the web. The resulting web surface may have a soft feel and high bulk and also provide good scrubbing capabilities when placed under pressure.

Additionally, in those embodiments wherein the elevated portions 56 have a width on the order of the length of the fibers in the web 34, the viscous material 30 in the surrounding depressed portions 58 of the web 34 may provide additional stability to the elevated portions 56, by anchoring the ends of the fibers in the elevated portions 56 of the web 34 in place.

Additional processing of the web is contemplated by the present invention as well. For example, if desired, the web may be microstrained by brushing, calendering, ring-rolling, or Walton roll treatment as are generally known in the art to achieve desired tactile properties. Such treatments may be applied before or after printing and fibrillating the viscous material. For example, rush transfer may be used as a means of microstraining the web during web formation, wherein in-plane compressive stresses may cause buckling and internal delamination of the web. In one embodiment internal delamination may occur during rush transfer when one side of the web is moist and the other dry, such as immediately after printing one side of the web with a water-based ink or the viscous material of the present invention.

By way of example only, the viscous material may be one of the Advantra™ series of hotmelts from H.B. Fuller Company (St. Paul, Minn.), such as HL 9253 packaging adhesive which as a recommended application temperature of 350° F., a viscosity of 1640 centiPoise (cP) at 350° F., 2380 cP at 325° F., and 1230 cP at 375° F., a specific gravity of 0.926, a Gardner Color value of 1 (the Gardner Color scale is described in ASTM D-1544, "Standard Test Method for Color of Transparent Liquids (Gardner Color Scale)"). Further examples include the class of Rapidex® Reactive Hot Melt Adhesives as well as the Clarity™ adhesives, both also of H.B. Fuller Company. Clarity™ HL-4164 hot melt, for example, has a Gardner Color of 4, a recommended application temperature of 300° F., a viscosity at 300° F. of 805 cP, a viscosity at 250° F. of 2650 cP, and a viscosity at 350° F. of 325 cP, with a specific gravity of 0.966. The Epolene waxes of Eastman Chemical Company represent another class of suitable hotmelts. One example is Epolene™ N021 Wax, with a softening point (Ring and Ball Softening Point) of 120° C., a weight-averaged molecular weight of 6,500 and a number-averaged molecular weight of 2,800 (unless otherwise specified, "molecular weight" as used herein refers to number-weighted molecular weight), a Brookfield viscosity of 350 cP at 150° C., and a cloud point of 87° C. (for a 2% solution in paraffin at 130° C.). Another example is Epolene™ G-3003 Polymer, with a softening point of 158° C., a Brookfield viscosity at 190° C. of 60,000 cP, and a weight-averaged molecular weight of 52,000 and a number-averaged molecular weight of 27,200 and, an acid number of 8 (in one embodiment, suitable hotmelts may have an acid number of about 8 or less, such as less than 2).

In one embodiment, the viscous material is not a latex, and in another embodiment the printed web may be substantially latex free or substantially free of natural latex.

In those embodiments wherein the viscous material is insoluble or resistant to water, the resulting textured web may have high wet resiliency, characterized by an ability to maintain high bulk and a three-dimensional structure when wet. In those embodiments wherein the viscous material is printed on both sides of a web, the viscous material may be the same or different compositions on either side. Moreover, the materials may be subsequently fibrillated on one or both sides, as desired.

When a hotmelt material is used, the equipment for processing the hotmelt and supplying a stream of hotmelt to the printing systems of the present invention may be any known hotmelt or adhesive processing devices. For example, the ProFlex® applicators of Hot Melt Technologies, Inc (Rochester, Mich.); the "S" Series Adhesive Supply Units of ITW Dynatec, Hendersonville, Tenn., as well as the DynaMelt "M" Series Adhesive Supply Units, the Melt-on-Demand Hopper, and the Hotmelt Adhesive Feeder, all of ITW Dynatec are all exemplary systems which may be used.

The viscous material may be substantially free of ink or may be a compound that does not comprise an ink.

Silicone adhesive materials could also be used in the present invention. Exemplary silicone pressure sensitive adhesives which may be used may include those commercially available from Dow Corning Corp., Medical Products and those available from General Electric. While not limiting, examples of possible silicone adhesives available from Dow Corning include those sold under the trade names BIO-PSA X7-3027, BIO-PSA X7-4919, BIO-PSA X7-2685, BIO-PSA X7-3122 and BIO-PSA X7-4502.

If desired, coloring additives may be included in the viscous material and the material may be white, colored or colorless. Other optional additives, in addition to inks, may also be added to the viscous material in minor amounts (typically less than about 25% by weight of the elastomeric phase) if desired. Such additives may include, for example, pH controllers, medicaments, bactericides, growth factors, wound healing components such as collagen, antioxidants, deodorants, perfumes, antimicrobials and fungicides.

The viscous material may be substantially free of water (e.g., water is not used as a solvent or carrier material for the viscous material), or may be substantially free of dyes or pigments (in contrast to typical inks), and may be substantially non-pigmented or uncolored (e.g., colorless or white), or may have a Gardner Color of about 8 or less, more specifically about 4 or less, and most specifically about 1 or less. In another embodiment, HunterLab Color Scale (from Hunter Associates Laboratory of Reston, Va.) measurements of the color of a 50 micron film of the viscous material on a white substrate yields absolute values for "a" and "b" each about 25 or less, more specifically each about 10 or less, more specifically still each about 5 or less, and most specifically each about 3 or less. The HunterLab Color Scale has three parameters, L, a, and b. "L" is a brightness value, "a" is a measure of the redness (+a) and greenness (–a), and the "b" value is a measure of yellowness (+b) and blueness (–b). For both the "a" and "b" values, the greater the departure from 0, the more intense the color. "L" ranges from 0 (black) to 100 (highest intensity). The viscous material may have an "L" value (when printed as a 50 micron film on a white background) of about 40 or greater, more specifically about 60 or greater, more specifically still about 80 or greater, and most specifically about 85 or greater. Measurement of materials to obtain HunterLab L-a-b values may be done with a Technibryte Micro TB-1 C tester manufactured by Technidyne Corporation, New Albany, Ind., USA.

In one embodiment, the viscous material may comprise an acrylic resin terpolymer. For example, the viscous material may comprise an acrylic resin terpolymer containing 30 to 55 percent by weight styrene, 20 to 35 percent by weight acrylic acid or methacrylic acid and 15 to 40 percent by weight of N-methylol acrylamide or N-methylol methacrylamide.

Other suitable viscous materials include acrylic based pressure sensitive adhesives (PSAs), suitable rubber based pressure sensitive adhesives and suitable silicone pressure sensitive adhesives. Examples of suitable polymeric rubber bases include one or more of styrene-isoprene-styrene polymers, styrene-olefin-styrene polymers including styrene-ethylene/propylene-styrene polymers, polyisobutylene, styrenebutadiene-styrene polymers, polyisoprene, polybutadiene, natural rubber, silicone rubber, acrylonitrile rubber, nitrile rubber, polyurethane rubber, polyisobutylene rubber, butyl rubber, halobutyl rubber including bromobutyl rubber, butadieneacrylonitrile rubber, polychloroprene, and styrene-butadiene rubber.

In one embodiment, a rubber based adhesive may be used that may have a thermoplastic elastomeric component and a resin component. The thermoplastic elastomeric component may contains about 55–85 parts of a simple A-B block copolymer wherein the A-blocks are derived from styrene homologs and the B-blocks are derived from isoprene, and about 15–45 parts of a linear or radical A-B-A block copolymer wherein the A-blocks are derived from styrene or styrene homologs and the B blocks are derived from conjugated dienes or lower alkenes, the A-blocks in the A-B block copolymer constituting about 10–18 percent by weight of the A-B copolymer and the total A-B and A-B-A copolymers containing about 20 percent or less styrene. The resin component may comprise tackifier resins for the elastomeric component. In general, any compatible conventional tackifier resin or mixture of such resins may be used. These include hydrocarbon resins, rosin and rosin derivatives, polyterpenes and other tackifiers. The adhesive composition may contain about 20–300 parts of the resin component per one hundred parts by weight of the thermoplastic elastomeric component. One such rubber-based adhesive is commercially available from A to Findley under the trade name HM3210.

Many different types of monomers and cross-linkable resins are known in the polymer art, their properties may be adjusted as taught in the art to provide rigidity, flexibility, or other properties.

Various types of elastomeric compositions are known, such as curable polyurethanes. The term "elastomer" or "elastomeric" is used to refer to rubbers or polymers that have resiliency properties similar to those of rubber. In particular, the term elastomer reflects the property of the material that it may undergo a substantial elongation and then return to its original dimensions upon release of the stress elongating the elastomer. In all cases an elastomer must be able to undergo at least 10% elongation (at a thickness of 0.5 mm) and return to its original dimensions after being held at that elongation for 2 seconds and after being allowed 1-minute relaxation time. More typically an elastomer may undergo 25% elongation without exceeding its elastic limit. In some cases elastomers may undergo elongation to as much as 300% or more of its original dimensions without tearing or exceeding the elastic limit of the composition. Elastomers are typically defined to reflect this elasticity as in ASTM Designation DS83-866 as a macromolecular material that at room temperature returns rapidly to approximately its initial dimensions and shape after substantial deformation by a weak stress and release of the stress. ASTM Designation D412-87 may be an appropriate procedure to evaluate elastomeric properties. Generally, such compositions include relatively high molecular weight compounds which, upon curing, form an integrated network or structure. The curing may be by a variety of means, including: through the use of chemical curing agents, catalysts, and/or irradiation. The final physical properties of the cured material are a function of a variety of factors, most notably: number and weight average polymer molecular weights; the melting or softening point of the reinforcing domains (hard segment) of the elastomer (which, for example, may be determined according to ASTM Designation D1238-86); the percent by weight of the elastomer composition which comprises the hard segment domains; the structure of the toughening or soft segment (low Tg) portion of the elastomer composition; the cross-link density (average molecular weight between crosslinks); and the nature and levels of additives or adjuvants, etc.

The softening temperature of a thermoplastic polymer may be approximated as the Vicat Softening Temperature according to ATM D 1525-91.

The viscous material may also comprise acrylic polymers including those formed from polymerization of at least one alkyl acrylate monomer or methacrylate, an unsaturated carboxylic acid and optionally a vinyl lactam. Examples of suitable alkyl acrylate or methacrylate esters include, but are not limited to, butyl acrylate, ethyl acrylate, 2-ethylhexyl acrylate, isooctyl acrylate, isononyl acrylate, isodecyl acrylate, methyl acrylate, methylbutyl acrylate, 4-methyl-2-pentyl acrylate, see-butyl acrylate, ethyl methacrylate, isodecyl methacrylate, methyl methacrylate, and the like, and mixtures thereof. Examples of suitable ethylenically unsaturated carboxylic acids include, but are not limited to, acrylic acid, methacrylic acid, fumaric acid, itaconic acid, and the like, and mixtures thereof. A preferred ethylenically unsaturated carboxylic acid monomer is acrylic acid. Examples of suitable vinyl lactams include, but are not limited to, N-vinyl caprolactam, 1-vinyl-2-piperidone, 1-vinyl-5-methyl-2-pyrrol id one, vinyl pyrrolidone, and the like, and mixtures thereof.

The viscous material may also include a tackifier. Tackifiers are generally hydrocarbon resins, wood resins, rosins, rosin derivatives, and the like. It is contemplated that any tackifier known by those of skill in the art to be compatible with elastomeric polymer compositions may be used with the present embodiment of the invention. One such tackifier found to be suitable is Wingtak 10, a synthetic polyterpene resin that is liquid at room temperature, and sold by the Goodyear Tire and Rubber Company of Akron, Ohio. Wingtak 95 is a synthetic tackifier resin also available from Goodyear that comprises predominantly a polymer derived from piperylene and isoprene. Other suitable tackifying additives may include Escorez 1310, an aliphatic hydrocarbon resin, and Escorez 2596, aC5-C9 (aromatic modified aliphatic) resin, both manufactured by Exxon of Irving, Tex. Of course, as may be appreciated by those of skill in the art, a variety of different tackifying additives may be used to practice the present invention.

In addition to tackifiers, other additives may be used to impart desired properties. For example, plasticizers may be included. Plasticizers are known to decrease the glass transition temperature of an adhesive composition containing elastomeric polymers. An example of a suitable plasticizer is Shellflex 371., a naphthenic processing oil available from Shell Oil Company of Houston, Tex. Antioxidants also may be included in the compositions. Exemplary antioxidants include Irgafos 168 and Irganox 565 available from Ciba-Geigy, Hawthorne, N.Y. Cutting agents such as waxes and surfactants also may be included in the adhesives.

In another embodiment, the viscous material may be substantially free of quaternary ammonium compounds, or may be substantially free independently of any of the following or any combination thereof: petrolatum, silicone oil, beeswax, emulsions, paraffin, fatty acids, fatty alcohols, any hydrophobic material with a melting point less than 50° C., epichlorohydrins, conventional papermaking wet strength additives (either temporary or permanent wet strength additives or both), starches and starch derivatives, gums; cellulose derivatives such as carboxymethylcellulose or carboxymethylcellulose; chitosan or other materials derived from shellfish; materials derived from proteins; superabsorbent material; a polyacrylate or polyacrylic acid; cationic polymers, surfactants, polyamides, polyester compounds, chlorinated polymers, heavy metals, water soluble polymers, water-soluble salts, a slurry, a dispersion, and opaque particles. It may also have a softening temperature about 60° C., such as about 80° C. or greater, more specifically about 100° C. or greater, most specifically about 130° C. or greater.

The viscous material printed on the web may set or cure in any fashion. For example, the viscous material may set or cure through application of heat, ultraviolet light or other forms of radiation, or due to chemical reaction which may merely require passage of a period of time. In one embodiment, the adhesive may cure through application of a cooling airflow, as when an airflow is used in separating and lengthening the fibrils molded out of the viscous material.

In one embodiment, the printed and fibrillated viscous material may be used to join the web to another layer or article, as in a laminated article. For example, a thermoplastic material, such as a hot melt material, may be printed and fibrillated on the surface of a web in a process such as that illustrated in FIG. 1 so as to form a controlled pattern of fibrils on the web surface. The rising fibrils may readily contact a neighboring substrate layer when forming a laminate structure and may have a well-controlled distribution defined by the printing process rather than by a much more random process, such as an airlaying process as is commonly used for distribution of binder fibers. The hot melt material, printed and fibrillated according to the present invention, may be on one or both adjacent surfaces, as desired. The improved contact and improved distribution of material may provide good inter-ply bonding and strength after the plies are pressed together and heat is applied.

In some embodiments, the printed viscous material is not used to join the tissue web to any other layer or article, but may be used to modify at least one of the following: the structure of the tissue web, the strength properties of the tissue web, the topography of the tissue web (increasing the texture or surface depth of the web), the wetting properties of the web, and the tactile properties of the web. More specifically, the printing and fibrillating of the viscous material may be used to create a high bulk web with enhanced texture and improved strength or wet resiliency, as described in U.S. Pat. No. 6,436,234, issued to Chen et al., Aug. 20, 2002, herein incorporated by reference. As one measure of wet resiliency described therein, Wet Compressed Bulk refers to the bulk of a fully wetted tissue sample (wetted to a moisture ratio of 1.1 g water/g dry fiber) under a load of 2 psi. Springback refers to the ratio of final low-pressure thickness at 0.025 psi to the initial low-pressure thickness at 0.025 psi of a fully wetted sample after two intervening compressive cycles comprising loading the tissue to 2 psi followed by removing the load. By way of example, a Springback of 1 indicates no loss in bulk of the sample due to intermediate compressions to 2 psi, whereas a value of 0.5 indicates that half of the bulk was maintained. The Wet Compressed Bulk of the web may be increased by about 5% or more, specifically by about 10% or more, more specifically by about 15% or more, most specifically by about 25% or more, by printing of viscous material according to the present invention, relative to an unprinted but otherwise substantially identical sample. The Springback may be increased by 0.03 or more, more specifically by about 0.05, most specifically by about 0.1 or more, by printing of viscous material according to the present invention, relative to an unprinted but otherwise substantially identical sample.

The viscous material may be applied to the web in any desired pattern. For example, the viscous material may form a continuous network or an effectively continuous network, such as through a pattern of small, discrete dots. A pattern of small discrete dots may be effectively continuous when the dots are spaced apart at a distance substantially less than the typical fiber length such that the dots define a pattern capable of enhancing the tensile strength of the web. For example, a web may be formed including softwood fibers with a mean fiber length of about 4 mm, and a pattern of fine dots having a diameter of about 0.5 mm or less may be spaced apart less than 1 mm between centers of the dots in a large-scale honeycomb pattern or rectilinear grid pattern, wherein the width of the characteristic adhesive free honeycomb cell or rectilinear grid cell is about 3 mm or less.

The viscous material may be printed in any desired pattern such as an interconnected network or a series of isolated elements or a combination of a network and isolated elements. The pattern may define recognizable objects such as flowers, stars, animals, humans, cartoon characters, and the like, or aesthetically pleasing patterns of any kind. For example, the pattern may comprise a series of parallel lines, parallel sinuous curves, a rectilinear grid, a hexagonal grid, isolated or overlapping circles or ellipses, isolated or overlapping polygons, isolated dots and dashes, and the like.

The area of the surface of the web that is covered by the viscous material may range from about 1% to about 100%, such as from about 5% to about 95%, specifically from about 10% to about 80%, more specifically from about 10% to about 50%, and most specifically from about 10% to about 40%. Alternatively, area of the surface of the web that is covered by the viscous material may be less than 50%, such as less than 30% or less than 15%, such as from 1% to 15%.

In one embodiment, the parameters of the pattern of the viscous material that is printed on the sheet may be dependent on the fiber length of the fibers in the outer surfaces of the web. Such interdependence may help to maintain good surface integrity. In those embodiments including long synthetic fibers in one or both outer surfaces of the web, the adhesive may be printed at a coarser scale and the web may still exhibit substantial gain in tensile and strength properties. Thus, with synthetic fibers of, for example, 15 mm or greater average length, the adhesive may be printed in a pattern having a characteristic cell size of about 5 mm or less.

Figure 5:
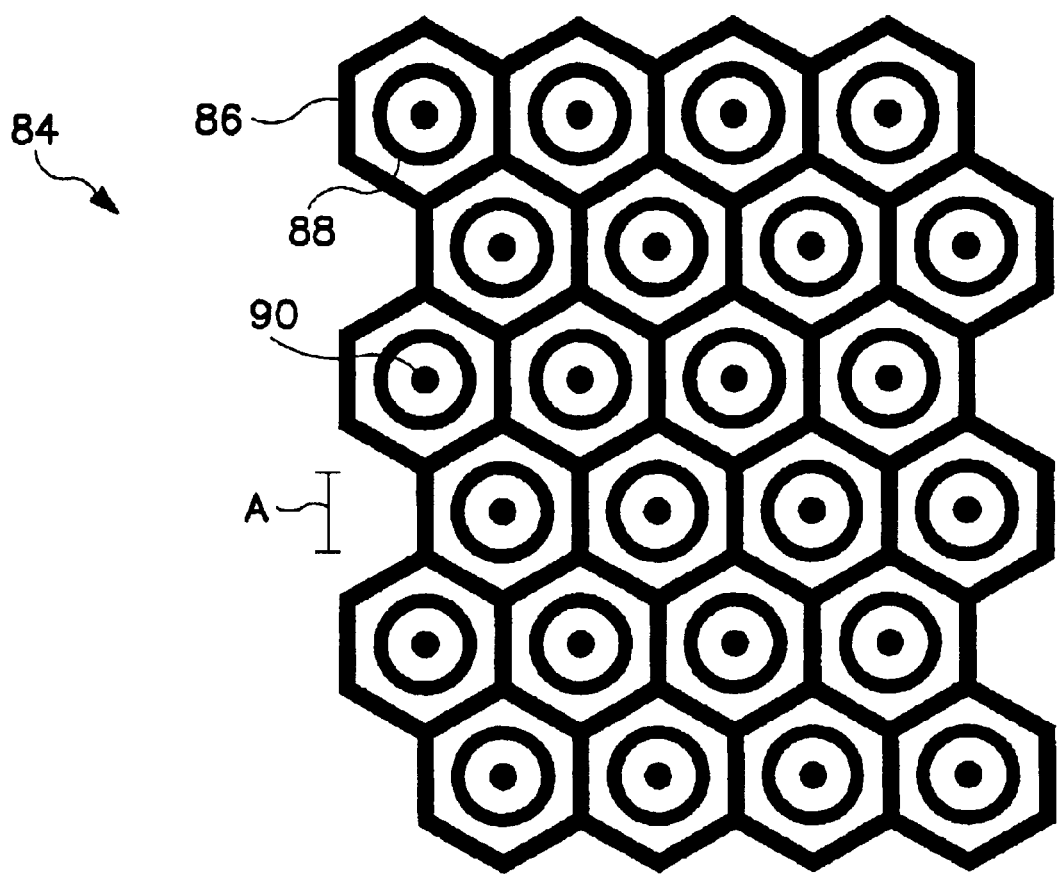
FIG. 5 depicts one possible printing pattern of a viscous material that may be imparted to a web according to the present invention.

FIG. 5 is a schematic of one embodiment of a pattern 84 of viscous material that may be printed onto a web (not shown) such as with a corresponding pattern engraved into a flexographic plate. In this embodiment, the pattern 84 includes a continuous network of hexagonal elements 86, with circles 88 and dots 90 within the hexagonal elements 86. The sides of the hexagonal elements 86 may have a characteristic length 'A' that may be about 0.5 mm or greater, more specifically about 1 mm or greater, more specifically still about 2.5 mm or greater, and most specifically about 5 mm or greater, with exemplary ranges of from about 1.5 mm to about 18 mm, or from about 3 mm to about 7 mm. In one embodiment, the characteristic length A is approximately equal to the length-weighed numerical average fiber length of the web or less, such as about 5 mm or less for a typical softwood tissue web or about 2 mm or less for a predominately hardwood tissue web. The pattern 84 of FIG. 5 is, of course, only one of countless different patterns that could be employed. Characteristic unit cells of such patterns may include elements of any shape, such as, for example, rectangles, diamonds, circles, ovals, bow-tie shaped elements, tessellated elements, repeating or non-repeating tile elements, dots, dashes, stripes, grid lines, stars, crescents, undulating lines, and the like, or combinations thereof. The characteristic width or length of the unit cell may be about 0.5 mm or greater, specifically about 1 mm or greater, more specifically about 2 mm or greater, and most specifically about 5 mm or greater, such as from about 0.5 mm to about 7 mm, or from about 0.8 mm to about 3.5 mm.

Figure 6:
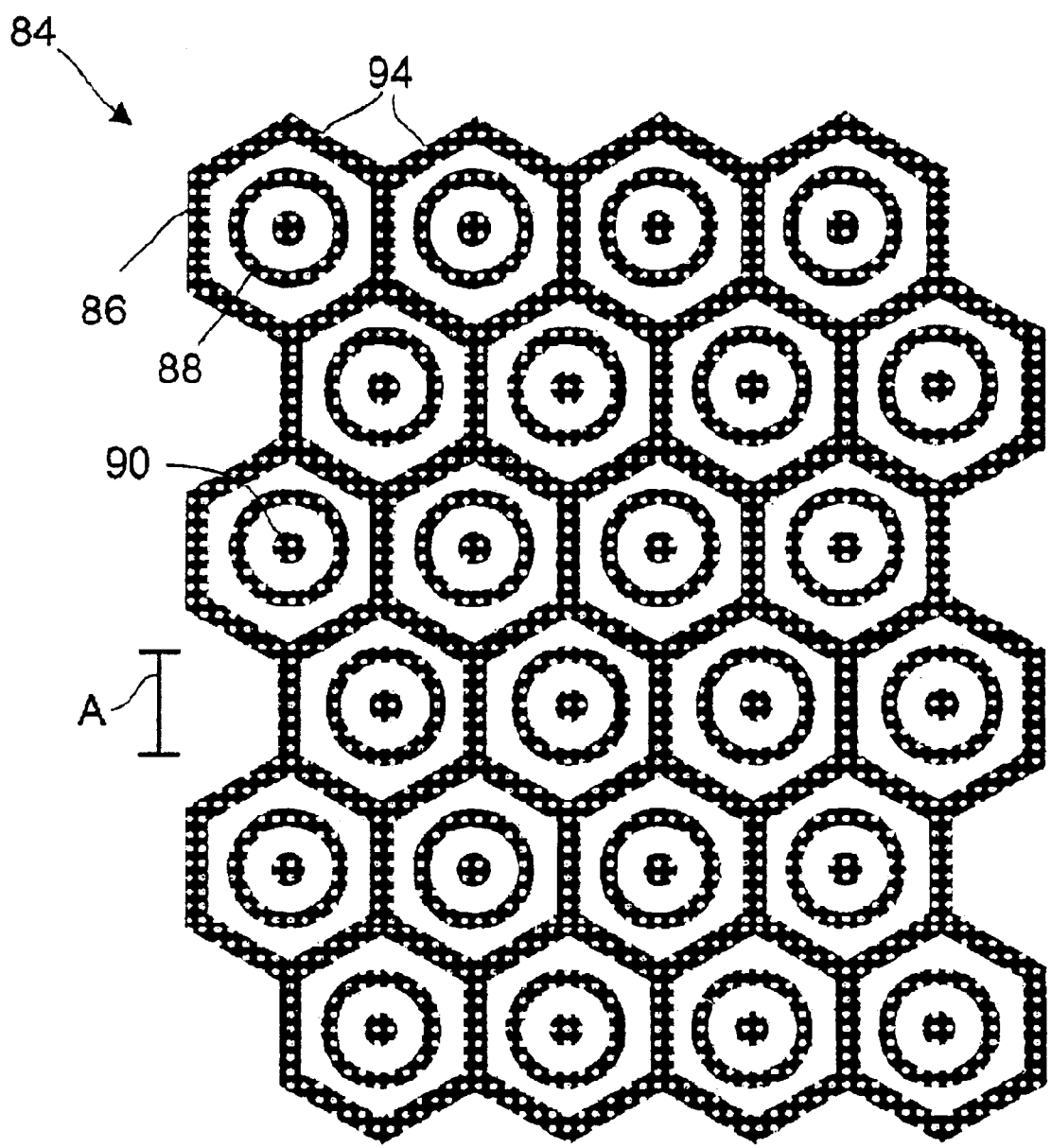
FIG. 6 depicts another possible printing pattern of a viscous material that may be imparted to a web according to the present invention.

FIG. 6 is a schematic of a pattern 84 of viscous material similar to that of FIG. 5, except that the present pattern 84 has been screened such that the solid portions of the pattern are broken up with fine dots 94 of unprinted regions. In experiments with hot melt adhesives, it has been found that by providing the screen effect shown in FIG. 6, better transfer of a hot melt to the surface of the web may be achieved. Advantages appear possible even for very small amounts of open surface area in the otherwise solids portions of the pattern. Thus, by combining unprinted dots or other elements to form a screening effect on the pattern 84, improved texturing of the web may be achieved. In some embodiments, the pattern of dots in the printing surface may serve as small reservoirs to hold more material and improve transfer to the web. In one embodiment, a screen pattern of dots is burned into the flexographic plate or other printing surface. In one embodiment, the dots may have a diameter of 100 microns or less, more specifically 50 microns or less.

In one embodiment, the printing pattern of the viscous material may be a heterogeneous pattern across the surface of the web. In other words, the printing pattern may define different regions of the web, with certain regions including viscous material which differs in application pattern from the other regions. In one embodiment, regions of the heterogeneously printed web may be all together free of the printed adhesive material. The improved control of material deposition and formation on the surface of the web afforded by the present invention may allow for products having well defined areas of specific product characteristics such as absorption, abrasiveness, softness, or hydrophobicity, for example. As such, a multi-zoned product may be formed with different areas of the product surface specifically adapted to provide different qualities. For example, a product may be formed with a first zone designed for grasping in the hand, with a soft, hydrophobic surface including nip-like fibrils, so as to avoid moisture contacting the skin, a second zone including a fibrillated highly abrasive surface for scrubbing, and a third zone, with little or no printed material printed in the zone, providing greater absorption characteristics.

The processes of the present invention may be carried out online after a web has been dried, or may be offline at a converting facility, as desired. For example, an online paper making process may be modified to include printing and fibrillating, and subsequent curing. In one embodiment of the present invention, a web may be formed, rush transferred, through-dried on a textured fabric, flexographically printed on one or both sides of the web with concurrent fibrillating of the printed material, then through dried to completion, microstrained, wound and converted.

The paper webs produced by the processes of the present invention may also be printed with other materials, in addition to the viscous materials of the present invention. For example, any decorative elements known in the art may be additionally printed onto the base webs using the low pressure printing technology such as that of the present invention or alternatively may be applied by other means. Decorative printing may be applied within the scope of the present invention in conjunction with application of the viscous material, as is the case when the viscous material is colored and is applied in an aesthetically pleasing pattern. Decorative printing may optionally be applied in a separate step. In one embodiment, decorative pigments such as the liquid crystal pigments may be applied to the webs of the present invention. For example, liquid crystal pigments may be applied to a dark substrate which may create colors that shift depending on the viewing angle ("color flops"). Helicone HC® pigments from Wacker-Chemie are an example of the materials that are used to create these effects. "Color flop" effects may be applied in this manner to any of the articles of the present invention.

Alternatively, any other additives, pigments, inks, emollients, pharmaceuticals or other skin wellness agents or the like described herein or known in the art may be applied to the web of the present invention, either uniformly or heterogeneously. For example, either surface of the web may be printed with an additive according to the present invention, have an additive sprayed substantially uniformly, or have an additive selectively deposited on all or a portion of the web. Skin wellness agents may include, for example, any known skin wellness agents such as, but not limited to, anti-inflammatory compounds, lipids, inorganic anions and cations, protease inhibitors, sequestration agents, antifungal agents, antibacterial agents, acne medications, and the like.

As used herein, the term "paper web" refers to a web comprising at least one layer of a cellulosic fibrous web such as a layer of wet laid paper, air laid fibrous webs, fluff pulp, coform (composites of meltblown polymers and papermaking fibers), and the like. The paper webs of the present invention may be used in many forms, including multilayered structures, composite assemblies, and the like such as two or more tissue plies that have been embossed, crimped, needled, coapertured, or subjected to other mechanical treatments to join them together, or that are joined by hotmelt adhesives, latex, curable adhesives, thermally fused binder particles or fibers, and the like. The plies may be substantially similar or dissimilar. Dissimilar plies may include a creped tissue web joined to an airlaid, a nonwoven web, an apertured film, an uncreped tissue web, a tissue web of differing color, basis weight, chemical composition (differing chemical additives), fiber composition, or may differ due to the presence of embossments, apertures, printing, softness additives, abrasive additives, fillers, odor control agents, antimicrobials, and the like. The web may also be used as a basesheet, such as in construction of wet wipes, paper towels, and other articles. For example, the web may be printed with a latex and then creped. In one embodiment, the web may be used for single or double print-creping. The web may also be printed or otherwise treated with wet strength resins on one side prior to contacting a Yankee dryer, wherein the wet strength resin assists in creping and provides improved temporary wet strength to the web. The tissue web may comprise synthetic fibers or other additives.

However, in one embodiment, the web has less than 20% by weight of synthetic polymeric material prior to printing, more specifically less than 10% by weight of synthetic polymeric material. In another embodiment, the web does not comprise a hydroentangled nonwoven web.

In one embodiment, the paper webs of the present invention may be laminated with additional plies of tissue or layers of nonwoven materials such as spunbond or meltblown webs, or other synthetic or natural materials. This could be done before or after printing and fibrillating with a viscous material. For example, in a cellulosic product containing two or more plies of tissue, such as bath tissue, a pair of plies such as the plies forming the opposing outer surfaces of the product may comprise any of the following: a creped and uncreped web; a calendered and uncalendered web; a web comprising hydrophobic matter or sizing agents and a more hydrophobic web; webs of two differing basis weights; webs of two differing embossment patterns; an embossed and unembossed web; a web with high wet strength and a web with low wet strength; a web having syncline marks and a web free of syncline marks; a web with antimicrobial additives and a web free of such additives; a web with asymmetrical domes and one free of domes; a through-dried web and a web dried without use of a through-dryer; webs of two different colors; an apertured web and an unapertured web; and the like. Lamination may be achieved through crimping, perf-embossing, adhesive attachment, etc.

The tissue webs of the present invention may be provided as single ply webs, either alone or in combination with other absorbent material. In another embodiment, two or more webs of the present invention may be plied together to make a multi-ply structure. If viscous material is printed on only one side of the web, the multi-ply article may have the printed sides facing the outside of the multi-ply article or turned toward the inside of the article, such that the unprinted sides face out, or may have one printed side of a web facing out on one surface of the article and an unprinted side facing out on the opposing surface of the article.

The products made from the webs of the present invention may be in roll form with or without a separate core, or may be in a substantially planar form such as a stack of facial tissues, or in any other form known in the art. Products intended for retail distribution or for sales to consumers will generally be provided in a package, typically comprising plastic (e.g., flexible film or a rigid plastic carton) or paperboard, having printed indicia displaying product data and other consumer information useful for retail sales. The product may also be sold in a package coupled with other useful items such as lotions or creams for skin wellness, pharmaceutical or antimicrobial agents for topical application, diaper rash treatments, perfumes and powders, odor control agents such as liquid solutions of cyclodextrin and other additives in a spray bottle, sponges or mop heads for cleaning with disposable high wet strength paper, and the like.

In another embodiment, the webs of the present invention may be used to produce wet wipes such as premoistened bath tissue. For good dispersibility and good wet strength, binders that are sensitive to ion concentration may be used such that the binder provides integrity in a wetting solution that is high in ion concentration, but loses strength when placed in ordinary tap water because of a lower ion strength.

The webs of the present invention may be subsequently treated in any way known in the art. The web may be provided with particles or pigments such as superabsorbent particles, mineral fillers, pharmaceutical substances, odor control agents, and the like, by methods such as coating with a slurry, electrostatic adhesion, adhesive attachment, by application of particles to the web or to the elevated or depressed regions of the web, for example such as application of fine particulates by an ion blast technique and the like. The web may also be calendered, embossed, slit, rewet, moistened for use as a wet wipe, impregnated with thermoplastic material or resins, treated with hydrophobic matter, printed, apertured, perforated, converted to multiply assemblies, or converted to bath tissue, facial tissue, paper towels, wipers, absorbent articles, and the like.

The tissue products of the present invention may be converted in any known tissue product suitable for consumer use. Converting may comprise calendering, embossing, slitting, printing, addition of perfume, addition of lotion or emollients or health care additives such as menthol, stacking preferably cut sheets for placement in a carton or production of rolls of finished product, and final packaging of the product, including wrapping with a poly film with suitable graphics printed thereon, or incorporation into other product forms.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention which is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. A paper product comprising:
   a paper web comprising papermaking fibers;
   a viscous material printed in a heterogeneous pattern on a first side of the paper web, wherein the viscous material is fibrillated to form a three-dimensional structure comprising fibrils rising from the surface of the paper web, the printed pattern comprising at least two regions differing in the applied basis weight of viscous material; wherein the paper web is a tissue web having a bulk between about 3 to about 20 cubic centimeters/gram.

2. The paper product of claim 1, wherein the paper web has a basis weight of between about 10 and about 200 grams per square meter.

3. The paper product of claim 1, wherein the paper web has a basis weight of between about 30 and about 90 grams per square meter.

4. The paper product of claim 1, wherein the at least two regions comprise a first region and a second region having a difference in mean fibril length of about 0.05 mm.

5. The paper product of claim 1, wherein the paper web has a Frazier air permeability of greater than about 10 cubic feet/minute.

6. The paper product of claim 1, wherein the paper web has a three-dimensional texture with a Surface Depth of about 0.2 mm or greater.

7. The paper product of claim 1, wherein the cured viscous material covers between about 10% and 90% of the surface area of the paper web.

8. The paper product of claim 1, wherein the viscous material is a hotmelt viscous material having a Brookfield viscosity at 20 rpm of about 20 poise or greater.

9. The paper product of claim 1, wherein the viscous material is a hotmelt viscous material having a Brookfield viscosity at 20 rpm of about 50 poise or greater.

10. The paper product of claim 1, wherein the viscous material is a hotmelt viscous material having a Brookfield viscosity at 20 rpm of about 500 poise or greater.

11. The paper product of claim 1, wherein the viscous material is a hotmelt viscous material having a Brookfield viscosity at 20 rpm of about 1000 poise or greater.

12. The paper product of claim 1, wherein the at least two regions comprise a first region and a second region having a difference in fibril density of about 100 fibrils per square centimeter or greater.

13. The paper product of claim 1, wherein the pattern of the applied viscous material defines a continuous network of unprinted regions with islands of printed regions therebetween.

14. The paper product of claim 13, wherein the fibrils extend from about 0.5 cm to about 1.5 cm above the surface of the paper web.

15. The paper product of claim 13, wherein the fibrils have a cross sectional diameter of about 5 micrometers or greater.

16. The paper product of claim 1, wherein the three-dimensional structure of the cured viscous material comprises an abrasive scrubbing pattern on the surface of the paper web.

17. The paper product of claim 1, wherein the mean fibril length of at least one of the at least two regions is about 0.2 mm or greater.

18. The paper product of claim 1, wherein two of the at least two regions comprise fibrils rising from the surface of the paper web, the fibrils having a density of at least about 100 fibrils per square centimeter in both regions.

19. The paper product of claim 1, comprising a second viscous material is printed on the second side of the paper web in a second pattern.

20. The paper product of claim 19, wherein the second viscous material printed on the second side of the paper web is fibrillated and cured to form a three-dimensional structure on the second side of the paper web.

21. The paper product of claim 19, wherein the first and second viscous materials are the same.

22. The paper product of claim 19, wherein the first and second viscous materials are different.

23. The paper product of claim 1, wherein an additive is printed on a surface of the web.

24. The paper product of claim 1, wherein the paper web is a stratified paper web.

25. The paper product of claim 1, wherein the viscous material is a latex.

* * * * *